US012119166B2

(12) United States Patent
Ogino et al.

(10) Patent No.: US 12,119,166 B2
(45) Date of Patent: Oct. 15, 2024

(54) METHOD FOR MANUFACTURING AN ELECTRONIC COMPONENT

(71) Applicant: Taiyo Yuden Co., Ltd., Tokyo (JP)

(72) Inventors: Tsuyoshi Ogino, Tokyo (JP); Takayuki Sekiguchi, Tokyo (JP); Koji Otsuka, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 1157 days.

(21) Appl. No.: 16/864,493

(22) Filed: May 1, 2020

(65) Prior Publication Data

US 2020/0258679 A1 Aug. 13, 2020

Related U.S. Application Data

(63) Continuation of application No. 16/202,943, filed on Nov. 28, 2018, now Pat. No. 10,679,786, which is a (Continued)

(30) Foreign Application Priority Data

Mar. 24, 2016 (JP) ................................ 2016-059394

(51) Int. Cl.
*H01F 7/06* (2006.01)
*H01F 17/00* (2006.01)
(Continued)

(52) U.S. Cl.
CPC ......... *H01F 27/32* (2013.01); *H01F 17/0013* (2013.01); *H01F 27/022* (2013.01); (Continued)

(58) Field of Classification Search
CPC .... H01F 17/0013; H01F 27/022; H01F 27/28; H01F 27/292; H01F 27/32; H01F 2017/0026; H01F 2017/004
See application file for complete search history.

(56) References Cited

U.S. PATENT DOCUMENTS 6,189,204 B1 * 2/2001 Shikama ............... H01F 27/292
29/608
9,308,553 B2 * 4/2016 Miwa .................... C04B 35/493
(Continued)

FOREIGN PATENT DOCUMENTS

JP 2000-150514 5/2000
JP 2003-0541419 2/2003
(Continued)

OTHER PUBLICATIONS

Decision of Refusal dated Jun. 25, 2019 issued in corresponding Japanese Patent Application No. 2016-059394 with English translation.

(Continued)

*Primary Examiner* — Paul D Kim

(74) *Attorney, Agent, or Firm* — Pillsbury Winthrop Shaw Pittman, LLP

(57) ABSTRACT

A method for manufacturing an electronic component comprises a step of forming an intermediate body including an insulator containing a resin and a conductive main body provided inside the insulator. The method further includes a step of forming an external electrode provided on the intermediate body and electrically coupled to the conductive main body. The method further includes a step of oxidizing the conductive main body, after forming the intermediate body including the insulator and the main body provided inside the insulator, to form an outer coating film on at least a part of a peripheral surface of the conductive main body.

17 Claims, 17 Drawing Sheets

Related U.S. Application Data continuation of application No. 15/412,506, filed on Jan. 23, 2017, now Pat. No. 10,312,015.

(51) Int. Cl.

| | |
|---|---|
| ***H01F 27/02*** | (2006.01) |
| ***H01F 27/28*** | (2006.01) |
| ***H01F 27/29*** | (2006.01) |
| ***H01F 27/32*** | (2006.01) |
| ***H01F 41/04*** | (2006.01) |

(52) U.S. Cl.

CPC ........... *H01F 27/28* (2013.01); *H01F 27/292* (2013.01); *H01F 41/04* (2013.01); *H01F 2017/0026* (2013.01); *H01F 2017/004* (2013.01)

(56) References Cited

U.S. PATENT DOCUMENTS

| | | | | |
|---|---|---|---|---|
| 9,514,885 | B2 | 12/2016 | Lee | |
| 9,601,259 | B2 | 3/2017 | Ozawa | |
| 9,773,611 | B2 * | 9/2017 | Kim | H01F 41/12 |
| 2001/0024739 | A1 | 9/2001 | Mizoguchi | |
| 2004/0005982 | A1 * | 1/2004 | Park | H01G 4/1227 501/137 |
| 2004/0166370 | A1 | 8/2004 | Mizoguchi et al. | |
| 2010/0033286 | A1 | 2/2010 | Katayama | |
| 2012/0019100 | A1 | 1/2012 | Iwanaga et al. | |
| 2013/0062994 | A1 | 3/2013 | Ogawa et al. | |
| 2014/0375412 | A1 | 12/2014 | Seko | |

FOREIGN PATENT DOCUMENTS

| | | |
|---|---|---|
| JP | 2005-005595 | 1/2005 |
| JP | 2006-310716 | 11/2006 |
| JP | 2006-324489 | 11/2006 |
| JP | 2009-182188 | 8/2009 |
| JP | 2014-232815 | 12/2014 |

OTHER PUBLICATIONS

Non-final Office Action U.S. Appl. No. 15/412,506 dated Aug. 28, 2018.

Non-final Office Action U.S. Appl. No. 16/202,943 dated Jun. 28, 2019.

Notice of Allowance dated Jan. 2, 2019 issued in corresponding U.S. Appl. No. 15/412,506.

Notice of Allowance dated Feb. 3, 2020 issued in corresponding U.S. Appl. No. 16/202,943.

Notice of Reasons for Refusal dated Jan. 8, 2019 issued in corresponding Japanese Patent Application No. 2016-059394 with English translation.

Office Action Chinese Patent Application No. 201710182787.1 dated Apr. 27, 2018 with English translation.

Office Action Taiwanese Patent Application No. 106107367 dated Jun. 26, 2018 with English translation.

Second Office Action dated Jan. 16, 2019 issued in corresponding Chinese Patent Application No. 201710182787.1 with English translation.

* cited by examiner

METHOD FOR MANUFACTURING AN ELECTRONIC COMPONENT

CROSS-REFERENCE TO RELATED APPLICATIONS

This application is a Continuation Application of U.S. Ser. No. 16/202,943, filed Nov. 28, 2018, now U.S. Pat. No. 10,679,786, which is a Continuation Application of U.S. patent application Ser. No. 15/412,506, filed on Jan. 23, 2017, now U.S. Pat. No. 10,312,015, which is based on and claims the benefit of priority from Japanese Patent Application Serial No. 2016-059394, filed on Mar. 24, 2016, the contents of each of which are hereby incorporated by reference in its entirety.

TECHNICAL FIELD

The present disclosure relates to an electronic component such as a coil.

BACKGROUND

Many electronic apparatus typically include coil components. Especially for mobile devices, coil components may have a chip form and may be surface mounted on a circuit substrate included in the mobile devices. As an example of the prior art, Japanese Patent Application Publication No. 2006-324489 disclosed a chip coil including a helical conductor that is embedded in a hardened insulating resin and at least whose one end is coupled to an external electrode. The helical direction of the conductor is arranged in parallel with the surface of a substrate on which the coil is mounted.

As another example, Japanese Patent Application Publication No. 2014232815 disclosed a coil component including a resin insulator, a coil-shaped internal conductor provided inside the insulator, and an external electrode electrically coupled to the internal conductor. The insulator is made in a cuboid shape with the length L, the width W, and the height H, where L>W≥H. The external electrode includes an conductor provided at each end of a plane perpendicular to the height H direction of the insulator as viewed in the length L direction. The internal conductor has a coil axis that is parallel with the width W direction of the insulator.

In the above-mentioned prior arts, insulators and conductors are alternately layered in the height direction using a photolithography and/or plating technique in order to obtain the coil component.

In recent years, miniaturization of components advances and so too with conductors and their sectional areas included in the components. Consequently it is very important to prevent deterioration of electric characteristics of the conductors while ensuring insulation between the conductors. Compared to electric components in which insulators are made of ceramics or the like, electric components in which insulators are made of resin are more likely to be affected by environments and especially oxidation of conductors included therein cannot be ignored as the miniaturization of the conductors advances.

SUMMARY

In view of the above, one object of the disclosure is to provide an electric component in which an insulation property between conductors can be ensured and deterioration of a conductive property due to environmental changes can be reduced.

An electronic component according one embodiment of the disclosure includes an insulator, an internal conductor, and an external electrode. The insulator is formed of a material that contains resin. The internal conductor is provided inside the insulator and includes a conductive main body and an outer coating film that is provided on at least a part of a peripheral surface of the conductive main body and has a resistivity higher than the conductive main body. The external electrode is disposed on the insulator and electrically coupled to the internal conductor.

In the electronic component, the internal conductor includes a conductive main body and an outer coating film that is provided on the peripheral surface of the conductive main body and has a resistivity higher than the conductive main body. The outer coating film serves as a passivation film that prevents the oxidation of the conductive main body. In this way, it is possible to secure an insulation property between conductive members of the internal conductor and to reduce deterioration of the conductive property due to environmental changes.

The conductive main body is typically made of a metal and the outer coating film is made of an oxide of the metal. With the outer coating film, it is possible to further prevent oxidation of the conductive main body caused by environmental changes.

The internal conductor may include a plurality of pillared conductive members that extend in one axial direction and a plurality of connecting conductive members that each couples predetermined two pillared conductive members among the plurality of pillared conductive members. The plurality of pillared conductive members and the plurality of connecting conductive members form a coil portion wound around an axis perpendicular to the one axial direction.

The insulator may include a first insulating layer that has a bonding surface perpendicular to the one axial direction and a second insulating layer bonded to the bonding surface, In this case, the plurality of pillared conductive members each include a first via conductive member that is provided in the first insulating layer and a second via conductive member that is provided in the second insulating layer and bonded to the first via conductive member.

The internal conductor may further include a contact disposed between the first via conductive member and the second via conductive member. The contact may be formed of a conductive material different from the conductive main body. In this way, it is possible to further prevent change in the resistive value of the pillared conductive members caused by environmental changes.

The first and second via conductive members and the contact may be formed of any material. For example, the first and second via conductive members may be made of a metallic material containing copper, silver or nickel, and the contact may be formed of a metallic material containing titanium or chromium.

The electronic component may further include a capacitor element disposed between the coil portion and the external electrode. The capacitor element includes a first internal electrode layer that is coupled to one end of the coil portion and a second internal electrode layer that is coupled to the other end of the coil portion and faces the first internal electrode layer in the one axial direction. In this way, the electric component that includes both the coil element and the capacitor element can be provided.

The internal conductor includes a plurality of windings, and in this case, the plurality of windings form a coil portion that is wound around one axial direction.

The insulator is formed of a material containing resin and ceramic particles.

As described above, according to the aspects of the disclosure it is possible to ensure an insulation property between conductors and to reduce deterioration of a conductive property due to environmental changes.

DESCRIPTION OF THE PREFERRED EMBODIMENTS

Embodiments of the disclosure will be described hereinafter with reference to the drawings.

First Embodiment

Basic Structure

Figure 1:
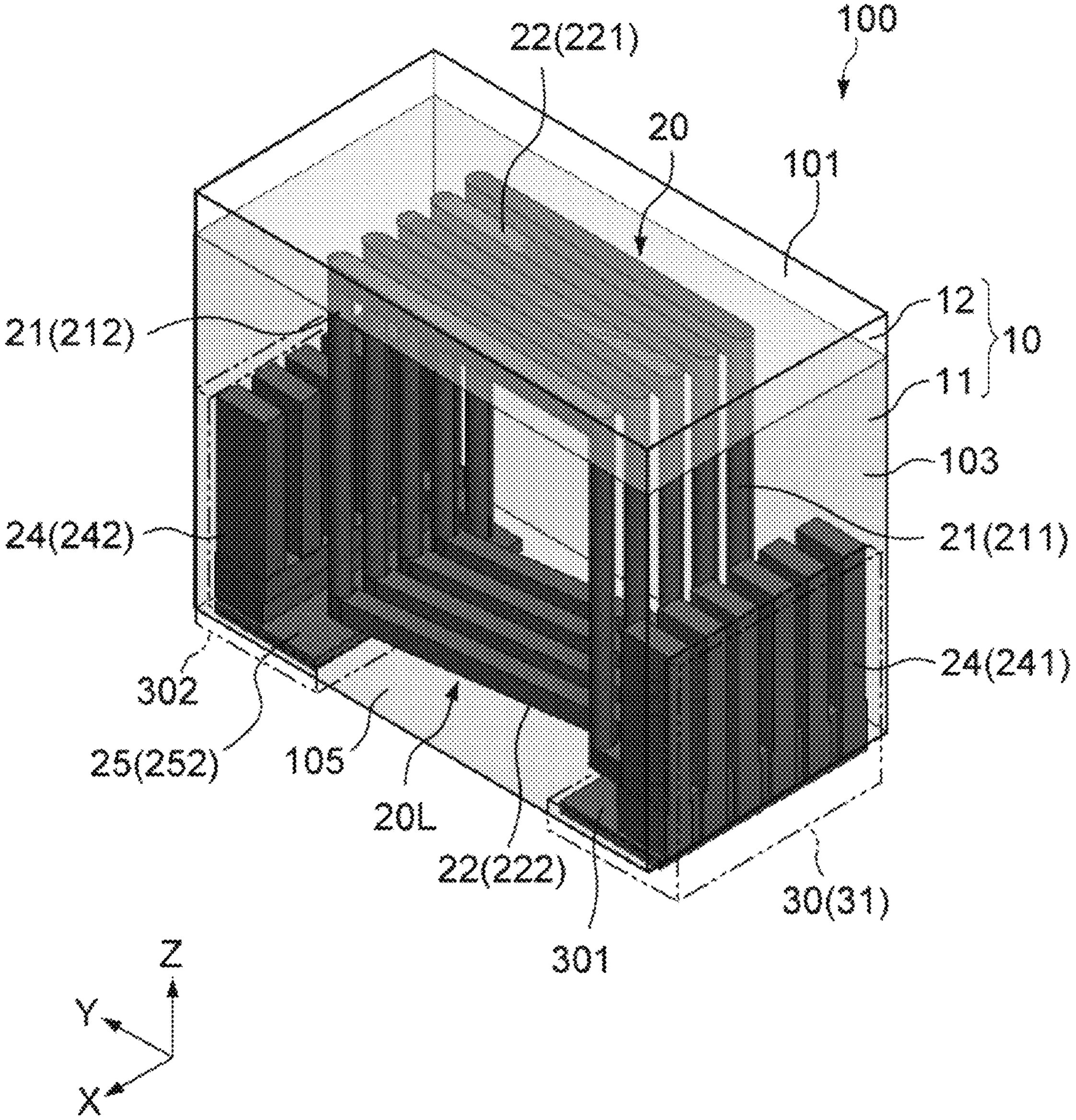
FIG. 1 is a schematic perspective view of an electronic component according to an embodiment of the disclosure.
Figure 2:
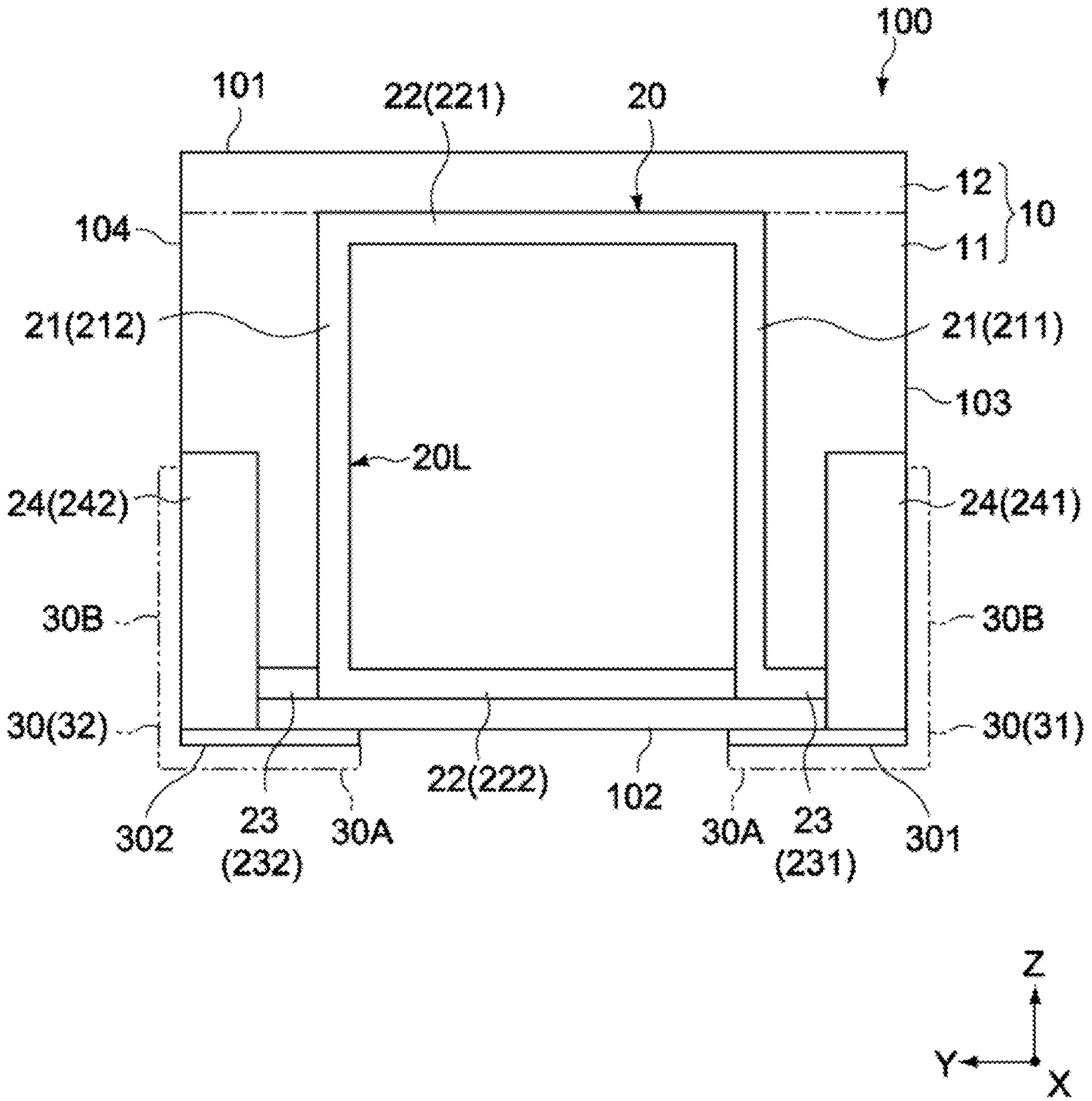
FIG. 2 is a schematic side view of the electronic component.
Figure 3:
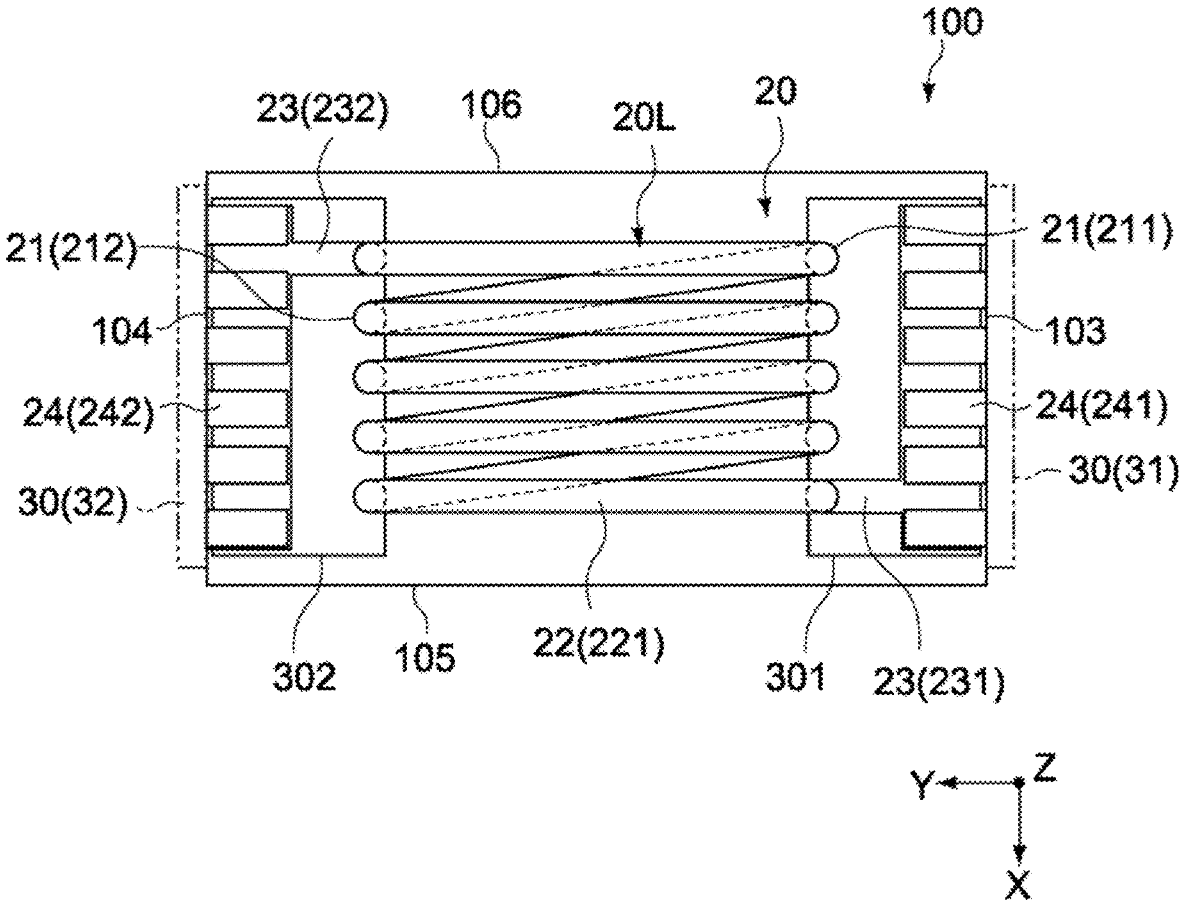
FIG. 3 is a schematic top view of the electronic component.

FIG. 1 is a schematic perspective view of an electronic component according to an embodiment of the disclosure, FIG. 2 is a schematic side view of the electronic component, and FIG. 3 is a schematic top view of the electronic component. In these drawings, the X-axis, Y-axis and Z-axis indicate three axial directions that are perpendicular to each other.

An electronic component 100 according to the embodiment may be configured as a coil component that is surface-mounted on a substrate. The electronic component 100 may include an insulator, an internal conductor 20, and an external electrode 30.

The insulator 10 may include a top surface 101, a bottom surface 102, a first end surface 103, a second end surface 104, a first side surface 105, and a second side surface 106. The insulator 10 is made in a cuboid shape that has the width in the X-axis direction, the length in the Y-axis direction and the height in the Z-axis direction. The insulator 10 may have a width of 0.05 to 0.3 mm, a length of 0.1 to 0.6 mm, and a height of 0.05 to 0.5 mm. In this embodiment, the width of the insulator 10 may be about 0.125 mm, the length may be about 0.25 mm, and the height may be about 0.2 mm.

The insulator 10 may include a body 11 and an upper portion 12. The body 11 may include the internal conductor 20 thereinside and form a main part of the insulator 10. The upper portion 12 provides the top surface 101 of the insulator 10. The upper portion 12 may be formed as, for example, a printed layer on which a model number of the electronic component 100 is printed.

The body 11 and the upper portion 12 may be formed of an insulating material that mainly contains resin. The insulating material for the body 11 may be a resin that is cured by heat, light, a chemical reaction or the like. Such resins may include, for example, polyimide, epoxy resin, liquid crystal polymer, and the like. The upper portion 12 may be formed of the above-mentioned material, or a resin film or the like.

The insulator 10 may be formed of a composite material that includes a filler in the resin. As such a filler, ceramic particles such as silica, alumina, zirconia or the like may be typically used. Configuration of the ceramic particles may not be particularly limited but typically be spherical. Alternatively it may be an acicular shape, a scale-like shape or the like.

The internal conductor 20 may be provided inside the insulator 10. The internal conductor 20 may include a plurality of pillared conductive members 21 and a plurality of connecting conductive members 22. The plurality of pillared conductive members 21 and the plurality of connecting conductive members 22 together form a coil portion 20L.

The plurality of pillared conductive members 21 may be each formed in a substantially columnar shape with a central axis arranged in parallel with the Z-axis direction. The plurality of pillared conductive members 21 may include two groups of the conductors that are arranged so as to face to each other in the substantially Y-axis direction. One of the two conductor groups is first pillared conductive members 211 and the first pillared conductive members 211 are arranged in the X-axis direction at a predetermined interval. The other of the two conductor groups is second pillared conductive members 212 and the second pillared conductive members 212 are also arranged in the X-axis direction at a predetermined interval. The substantially columnar shape herein may include any prism of which cross section perpendicular to the axis (in the direction perpendicular to the central axis) is a circle, an ellipse, or an oval. For example, the substantially columnar shape may mean any prism whose cross section is an ellipse or an oval in which the ratio of the major axis to the minor axis is 3 or smaller.

The first pillared conductive members 211 and the second pillared conductive members 212 may be configured to have the same radius and the same height respectively. In the illustrated example, the first pillared conductive members 211 and the second pillared conductive members 212 may include five members each. As will be described later, the first and second pillared conductive members 211, 212 may be formed by stacking more than one via conductive members in the Z-axis direction. Note that the reason why the pillared members have the substantially same radius is to prevent increase of resistance and this may be realized by reducing variation in the dimension of the pillared members as viewed in the same direction to 10% or smaller. Moreover the reason why the pillared members have the substantially same height is to secure stacking accuracy of the layers and this may be realized by reducing a difference in the height of the pillared members to, for example, 1 μm or smaller.

The plurality of connecting conductive members 22 may include two groups of conductors that are formed in parallel with the XY plane and arranged so as to face to each other in the Z-axis direction. One of the two conductor group is first connecting conductive members 221 that extend along the Y-axis direction and are arranged in the X-axis direction at a predetermined interval so as to connect between the first pillared conductive members 211 and the second pillared conductive members 212 respectively. The other of the two conductor group is second connecting conductive members 222 that extend at a predetermined angle with the Y-axis direction and are arranged in the X-axis direction at a predetermined interval so as to connect between the first pillared conductive members 211 and the second pillared conductive members 212 respectively. In the illustrated example, the first connecting conductive members 221 may include five connecting conductive members and the second connecting conductive members 222 may include four connecting conductive members.

Referring aging to FIG. 1, the first connecting conductive members 221 are each connected with upper ends of a predetermined pair of the pillared conductive members 211, 212, and the second connecting conductive members 222 are each connected with lower ends of a predetermined pair of the pillared conductive members 211, 212. More specifically, the first and second pillared conductive members 211, 212 and the first and second connecting conductive members 221, 222 may be each connected to each other so as to form a rectangular helix in the X-axis direction. In this manner, provided is the coil portion 20L that has the central axis (a coil axis) in the X-axis direction and has a rectangular opening.

The internal conductor 20 may further include an extended portion 23, a comb-tooth block portion 24 and the coil portion 20L may be connected to the external electrode 30 (31, 32).

The extended portion 23 may include a first extended portion 231 and a second extended portion 232. The first extended portion 231 may be coupled to a lower end of the first pillared conductive member 211 that forms one end of the coil portion 20L, and the second extended portion 232 may be coupled to a lower end of the second pillared conductive member 212 that forms the other end of the coil portion 20L. The first and second extended portions 231, 232 may be provided in the XY plane in which the second connecting conductive members 222 are provided and may be arranged in parallel with the Y-axis direction.

The comb-tooth block portion 24 may include a first comb-tooth block 241 and a second comb-tooth block 242 that are disposed so as to face to each other in the Y-axis direction. The first and second comb-tooth blocks 241, 242 may each be arranged such that their comb tooth ends face upward in FIG. 1. A part of the first and second comb-tooth blocks 241, 242 may be exposed on the end surfaces 103, 104 and the bottom surface 102 of the insulator 10. The first and second extended portions 231, 232 may be coupled to a space between predetermined two adjacent comb teeth of the first and second comb-tooth block portions 241, 242 respectively. At the bottom of the first and second comb-tooth block portions 241, 242, conductive layers 301, 302 that are underlayers of the external electrode 30 may be provided respectively (see FIG. 2).

The external electrode 30 may form an external terminal for surface mounting and may include first and second external electrodes 31, 32 that face to each other in the Y-axis direction. The first and second external electrodes 31, 32 may be formed in designated regions on the outer surface of the insulator 10.

More specifically, the first and second external electrodes 31, 32 may each include a first portion 30A that covers each end of the bottom surface of the insulator 10 in the Y-axis direction, and a second portion 30B that covers the end surfaces 103, 104 of the insulator 10 over a predetermined height of the end surfaces 103, 104 as illustrated in FIG. 2. The first portions 30A may be electrically connected to the bottoms of the first and second comb-tooth block portions 241, 242 through the conductive layers 301, 302 respectively. The second portion 30B may be formed on the end surfaces 103, 104 of the insulator 10 so as to cover the comb teeth portions of the first and second comb-tooth block portions 241, 242.

The pillared conductive members 21, the connecting conductive members 22, the extended portion 23, the comb-tooth block portion 24, and the conductive layers 301, 302 may be formed of a metal such as Cu (copper), Al (aluminum), Ni (nickel) or the like. In this embodiment, these may be formed of copper or a copper alloy plated layer. The first and second external electrodes 31, 32 may be formed by, for example, Ni/Sn plating.

Figure 4:
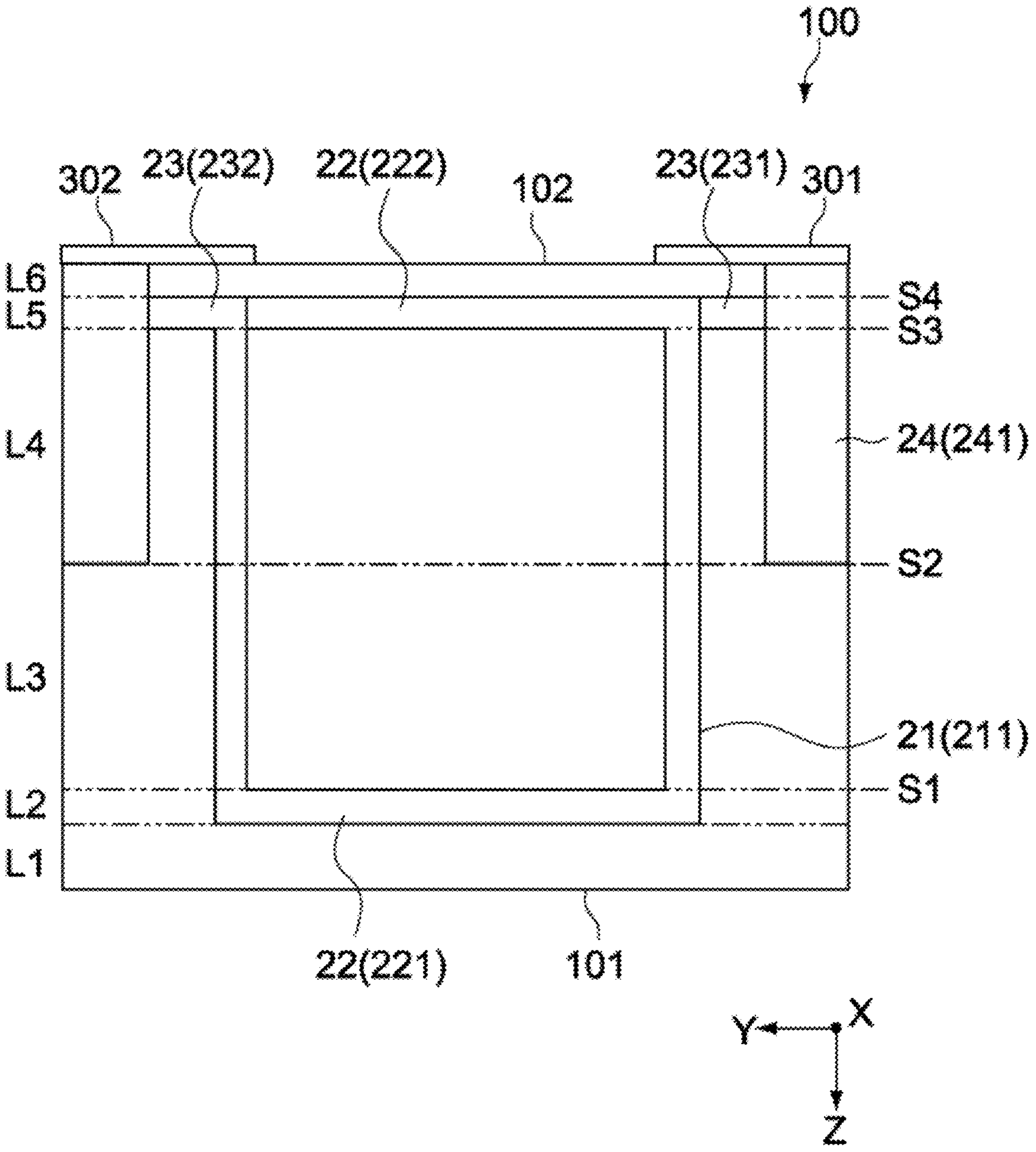
FIG. 4 is a schematic perspective view of the upside-down electronic component.

FIG. 4 is a schematic side view of the upside-down electronic component 100. Referring to FIG. 4, the electronic component 100 may include a film layer L1 and electrode layers L2-L6. In the embodiment, the film layer L1 and the electrode layers L1-L6 may be stacked sequentially in the Z-axis direction from the top surface 101 to the bottom surface 102. The number of the layers may not be particularly limited and may be six in this example.

The film layer L1 and the electrode layers L2-L6 may include elements of the insulator 10 and the internal conductor 20. FIGS. 5A-5F are schematic top views of the film layer L1 and the electrode layers L2-L6 of FIG. 4.

Figure 5A:
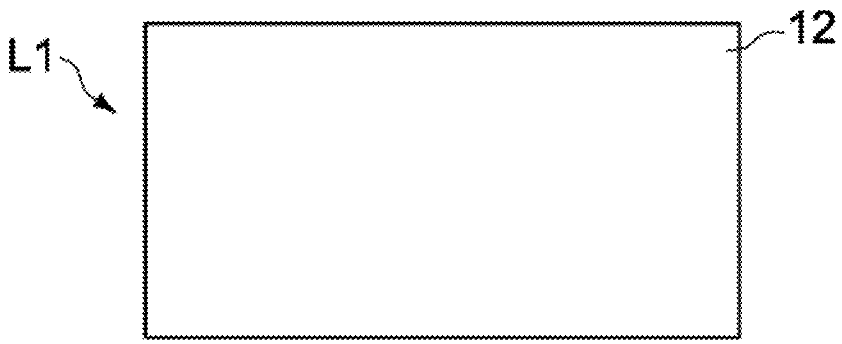
FIGS. 5A to 5F are schematic top views of an electrode layer included in the electronic component.
Figure 5B:
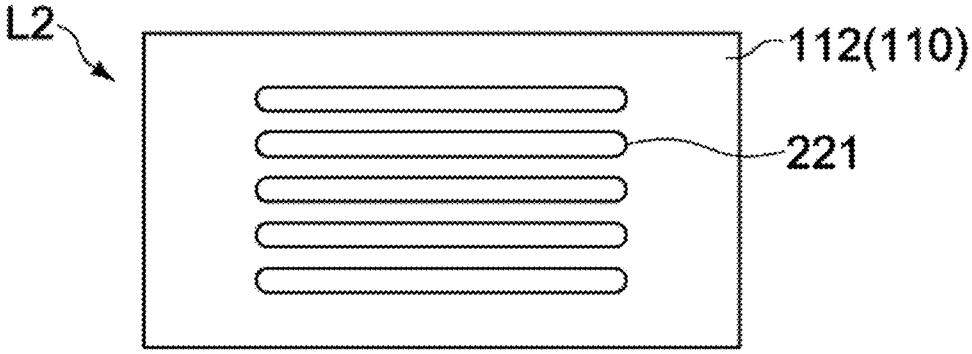
Figure 5C:
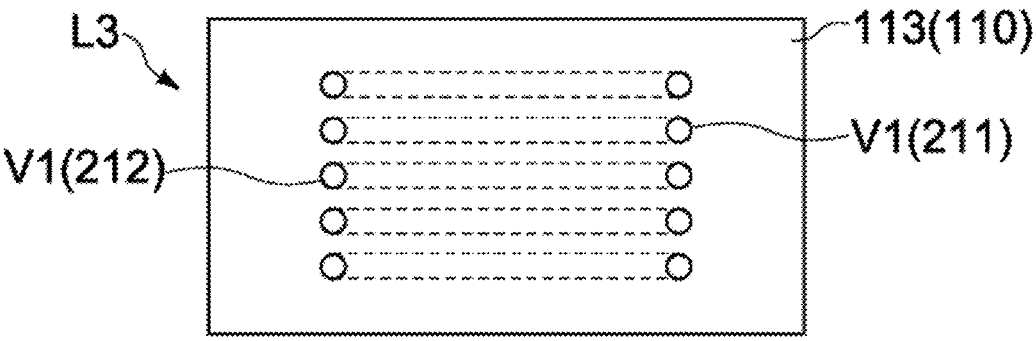
Figure 5D:
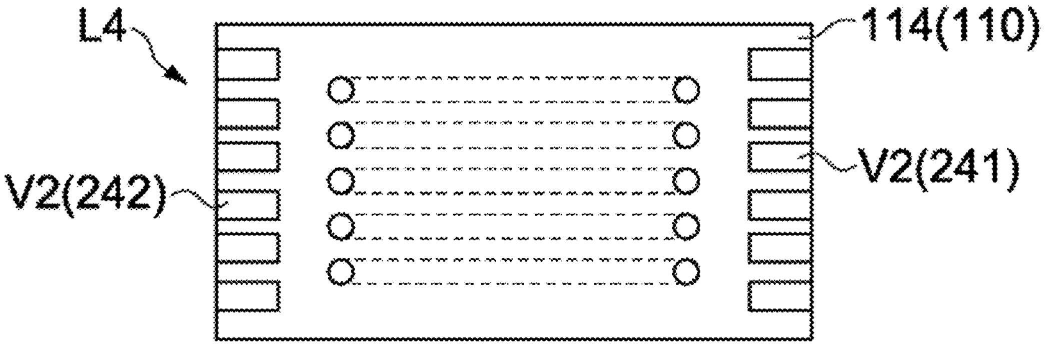
Figure 5E:
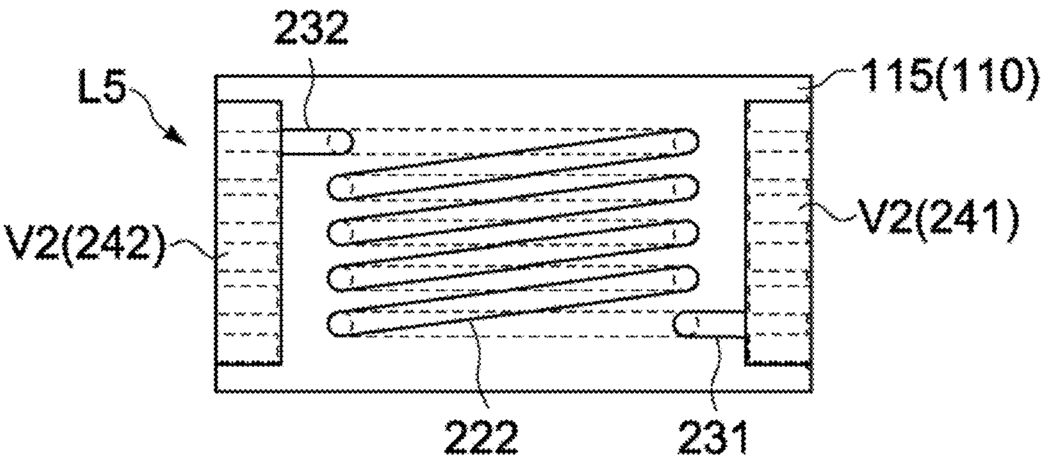
Figure 5F:
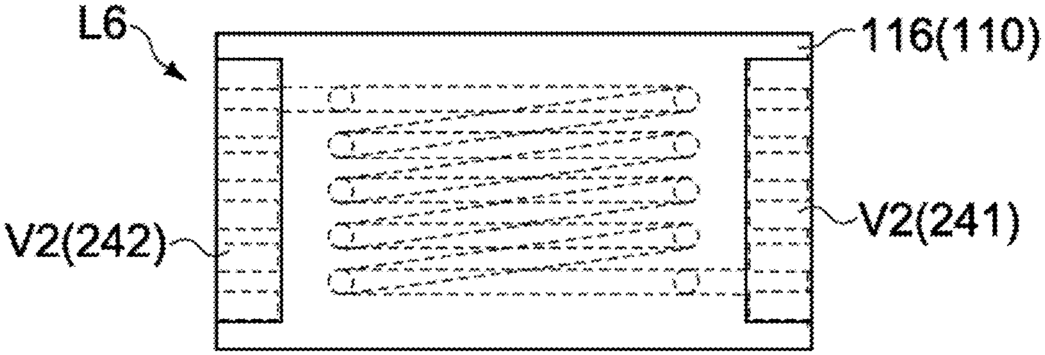

The film layer L1 may be formed of the upper portion 12 that serves as the top surface 101 of the insulator 10 (FIG. 5A). The electrode layer L2 may include an insulating layer 110 (112) that forms a part of the insulator 10 (the body 11), and the first pillared conductive members 211 (FIG. 5B). The electrode layer L3 may include the insulating layer 110 (113), and via conductive members V1 that form a part of the pillared conductive members 211, 212 (FIG. 5C). The electrode layer L4 may include the insulating layer 110 (114), the via conductive members V1, and via conductive members V2 that form a part of the comb-tooth block portions 241, 242 (FIG. 5D). The electrode layer L5 may include the insulating layer 110 (115), the via conductive members V1, V2, the extended portions 231, 232, and the second connecting conductive members 222 (FIG. 5E). The electrode layer L6 may include the insulating layer 110 (116) and the via conductive members V2 (FIG. 5F).

The electrode layers L2-L6 may be stacked in the height direction with bonding surfaces S1-S4 (see FIG. 4) interposed therebetween. Accordingly, the insulating layers 110 and the via conductive members V1, V2 have boundaries in the height direction. The electronic component 100 may be manufactured by a build-up method in which the electrode layers L2-L6 are sequentially fabricated and layered in the stated order from the electrode layer L2.

Basic Manufacturing Process

A basic manufacturing process of the electronic component 100 will be now described. A plurality of the electronic components 100 may be simultaneously fabricated on a wafer and may be then diced into pieces (chips).

FIGS. 6 to 8 are schematic sectional views of an element unit area to illustrate a part of the manufacturing process of the electronic component 100. More specifically, in the manufacturing process, a resin film 12A (the film layer L1) is adhered to a base plate S to form the upper portion 12 and the electrode layers L2 to L6 are sequentially formed thereon. As the base plate S, a silicon, glass or sapphire substrate may be used. Typically a conductive pattern that forms the internal conductor 20 may be formed by electroplating, subsequently the formed conductive pattern may be covered by an insulating resin material to form the insulating layer 110. These steps may be repeated.

FIGS. 6A to 6E and FIGS. 7A to 7D illustrate a manufacturing process of the electrode layer L3.

Figure 6A:
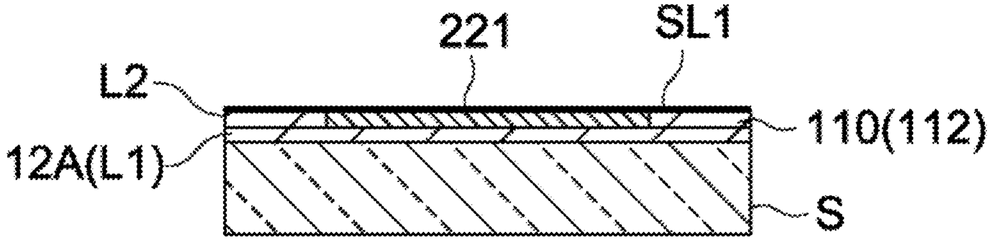
FIGS. 6A to 6E are schematic sectional views of an element unit area to illustrate a basic manufacturing flow of the electronic component.

In this process, a seed layer (a feed layer) SL1 for electroplating may be formed on the surface of the electrode layer L2 by, for example, sputtering (FIG. 6A). The seed layer SL1 may be formed of any conductive material, for example, Ti (titanium) or Cr (chromium). The electrode layer L2 may include the insulating layer 112 and the connecting conductive members 221. The connecting conductive members 221 may be provided under the insulating layer 112 so as to contact the resin film 12A.

Figure 6B:
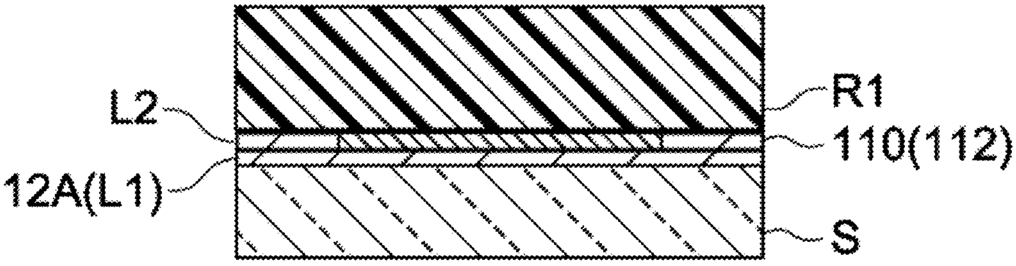
Figure 6C:
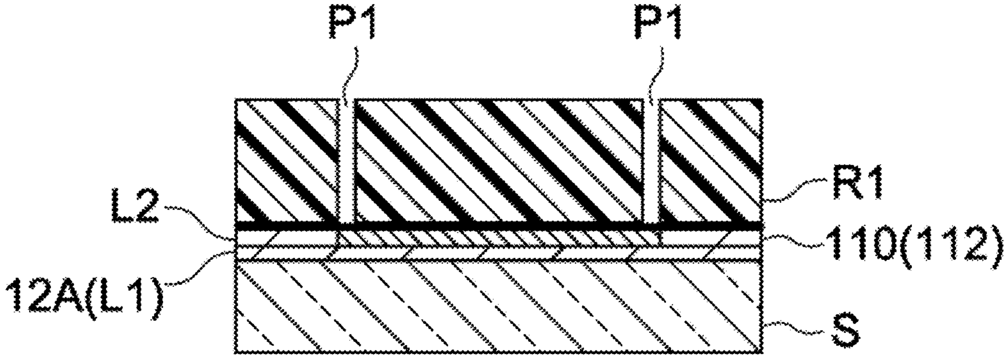
Figure 6D:
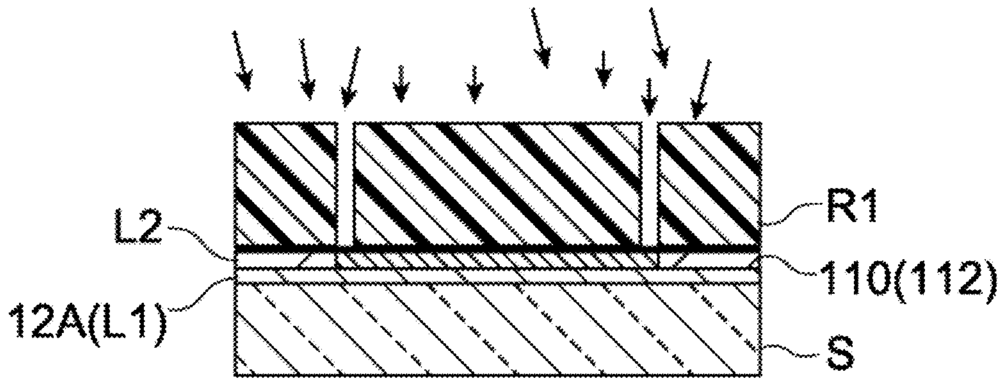

Subsequently a resist film R1 may be formed on the seed layer SL1 (FIG. 6B). The resist film R1 may be exposed and developed to form a resist pattern having openings P1 that face the via conductive members V13 which form a part of the pillared conductive members 21 (211, 212) through the seed layer SL1 (FIG. 6C). Subsequently a descum process may be performed to remove resist residue in the opening P1 (FIG. 6D).

Figure 6E:
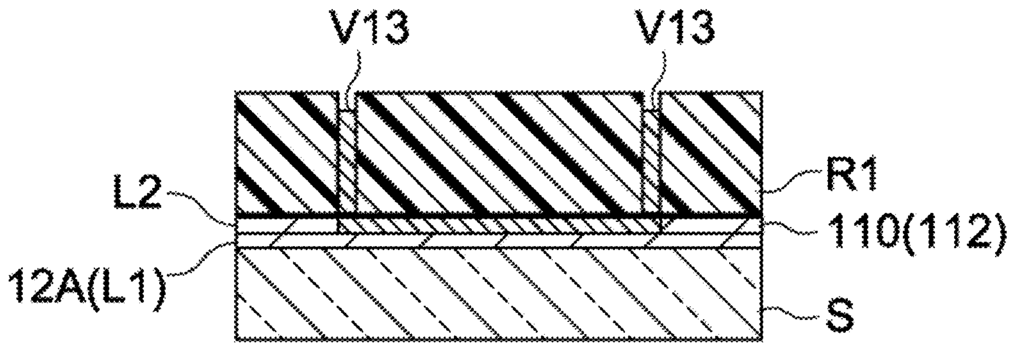
Figure 7A:
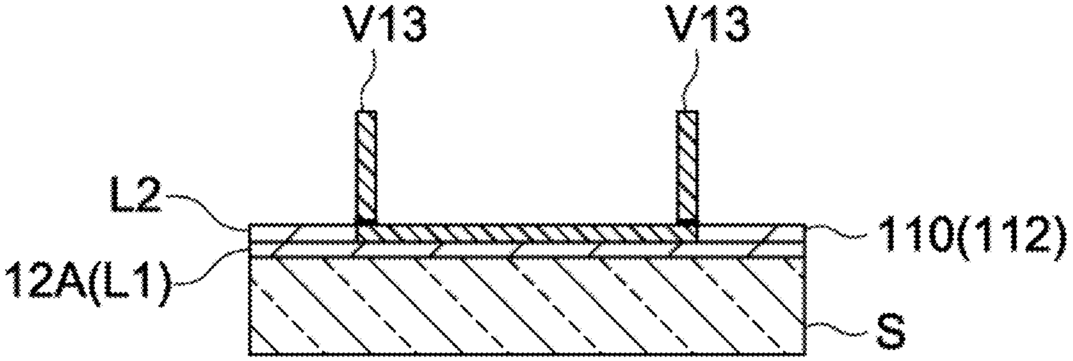
FIGS. 7A to 7D are schematic sectional views of an element unit area to illustrate a basic manufacturing flow of the electronic component.
Figure 7B:
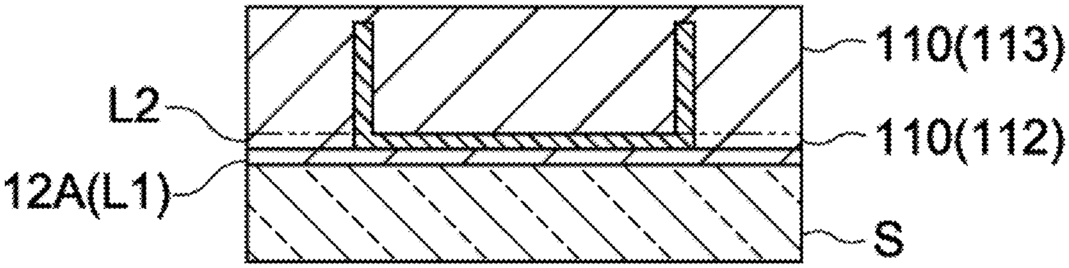
Figure 7C:
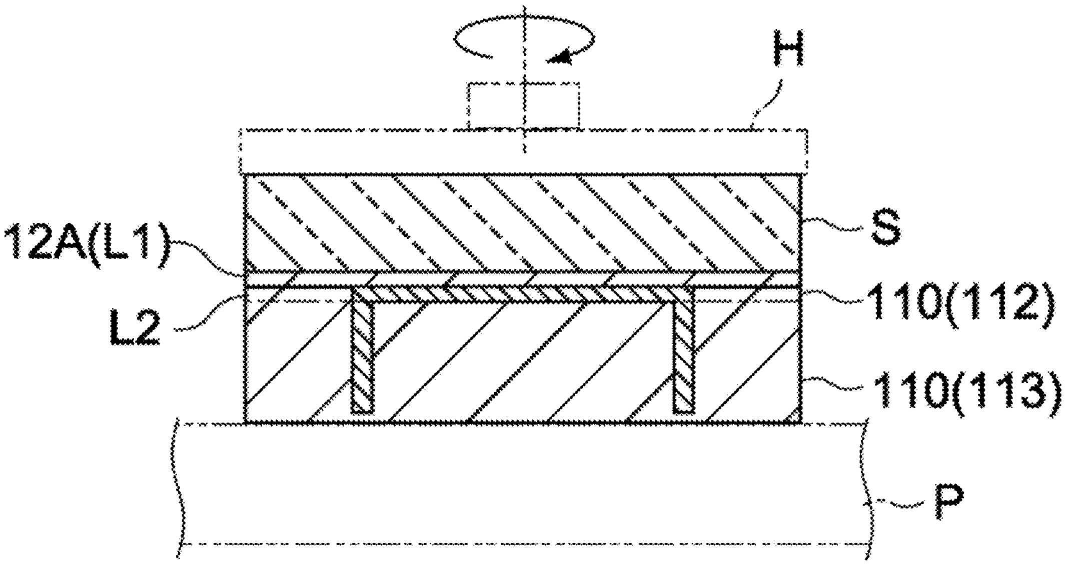
Figure 7D:
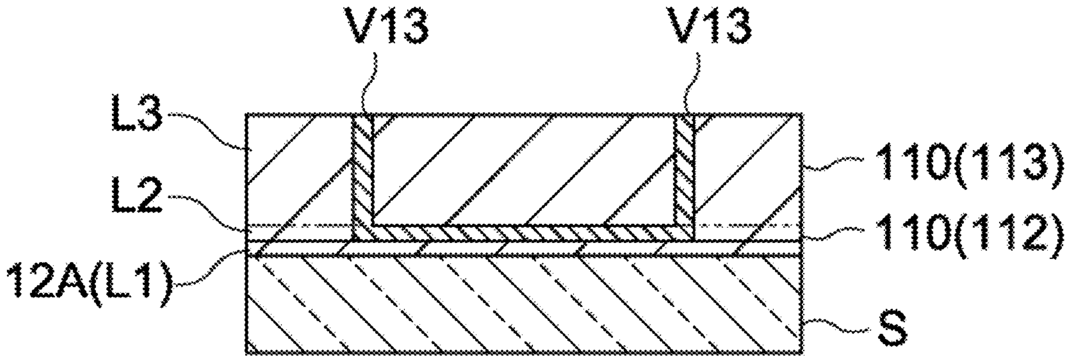

The base plate S may be then immersed in a Cu plating bath and an voltage may be applied to the seed layer SL1 to form the plurality of via conductive members V13 made of a Cu plating layer within the openings P1 (FIG. 6E). After the resist film R1 and the seed layer SL1 may be removed (FIG. 7A), the insulating layer 113 that covers the via conductive members V13 may be formed (FIG. 7B). The insulating layer 113 may be formed by printing or applying a resin material or applying a resin film on the electrode layer L2 and then hardening the resin. After the resin is hardened, the surface of the insulating layer 113 may be polished so as to expose tips of the via conductive members V13 by using a polishing apparatus such as a chemical mechanical polish machine (CMP machine), a grinder or the like (FIG. 7C). FIG. 7C illustrates an example of the polishing process (CMP) of the insulating layer 113 with a revolving polishing pad P. Here, the base plate S may be placed upside down on a polishing head H that is capable of spinning. As described above, the electrode layer L3 may be formed on the electrode layer L2 (FIG. 7D).

A fabrication method of the insulating layer 112 has not been described above, but it may be typically formed in the same manner as the insulating layer 113, more specifically, a resin material may be printed or applied or a resin film may be applied and then cured. The cured resin may be then polished by chemical mechanical polishing (CMP), a grinder or the like.

In the same manner as described above, the electrode layer L4 may be formed on the electrode layer L3.

A plurality of via conductive members (second via conductive members) that are coupled to the via conductive members V13 (first via conductive members) may be formed on the insulating layer 113 (a second insulating layer) of the electrode layer L3. More specifically, a seed layer that covers the surface of the first via conductive members may be formed on the surface of the second insulating layer. A resist pattern that has openings at the position corresponding to the surface of the first via conductive members may be then formed and the second via conductive members may be formed by electroplating using the resist pattern as a mask. A third insulating layer that covers the second via conductive members may be subsequently formed on the second insulating layer. The surface of the third insulating layer may be then polished to expose tips of the second via conductive members.

In the above-described fabrication process of the second via conductive members, the via conductive members V2 that form a part of the comb-tooth block portion 24 (241, 242) may be formed at the same time (see FIG. 4 and FIG. 5D). In this case, the resist pattern has openings that correspond to the region where the via conductive members V2 are formed in addition to the openings that correspond to the region where the second via conductive members are formed.

FIGS. 8A to 8D illustrate a part of the manufacturing process of the electrode layer L5.

Figure 8A:
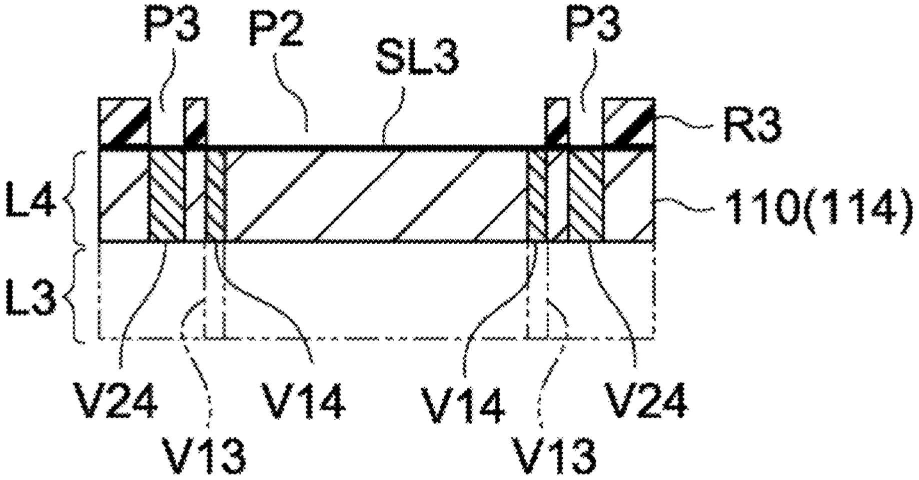
FIGS. 8A to 8D are schematic sectional views of an element unit area to illustrate a basic manufacturing flow of the electronic component.
Figure 8B:
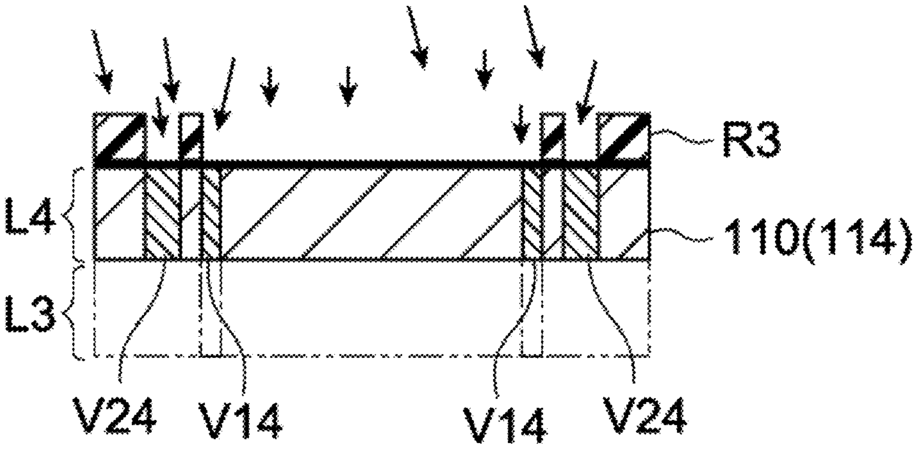

A seed layer SL3 for electroplating may be firstly formed on the electrode layer L4, and then a resist pattern (a resist film R3) that has openings P2, P3 may be sequentially formed on the seed layer SL3 (FIG. 8A). Subsequently a descum process may be performed to remove resist residue in the openings P2, P3 (FIG. 8B).

The electrode layer L4 may include the insulating layer 114 and via conductive members V14, V24. The via conductive members V14 may correspond to the via members (V1) that form a part of the pillared conductive members 21 (211, 212), and the via conductive members V24 may correspond to the via members (V2) that correspond to a part of the comb-tooth block portion 24 (241, 242) (see FIGS. 5C and 5D). The opening P2 may face the via conductive member V14 in the electrode layer L4 with the seed layer SL3 interposed therebetween, and opening P3 may face the via conductive member V24 in the electrode layer L4 with the seed layer SL3 interposed therebetween. The openings P2 may be each formed in the shape that conforms to the corresponding connecting conductive member 222.

Figure 8C:
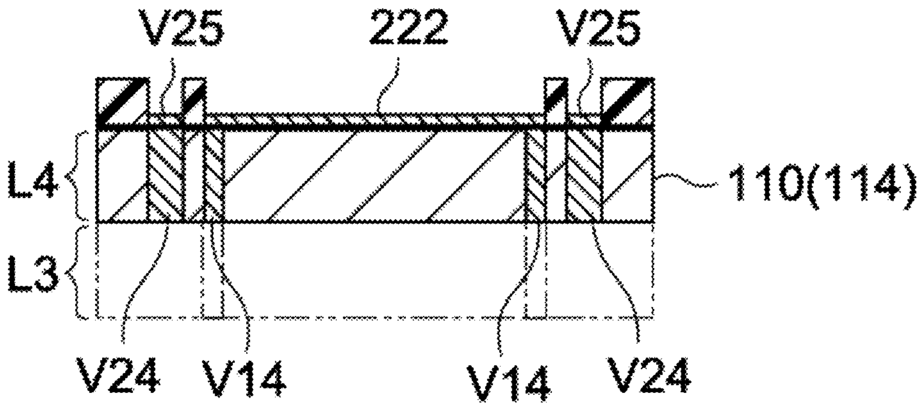

The base plate S may be then immersed in a Cu plating bath and an voltage may be applied to the seed layer SL3 to form via conductive members V25 and the connecting conductive members 222 made of a Cu plating layer within the openings P2, P3 (FIG. 8C). The via conductive members V25 may correspond to the via members (V2) that form a part of the comb-tooth block portion 24 (241, 242).

Figure 8D:
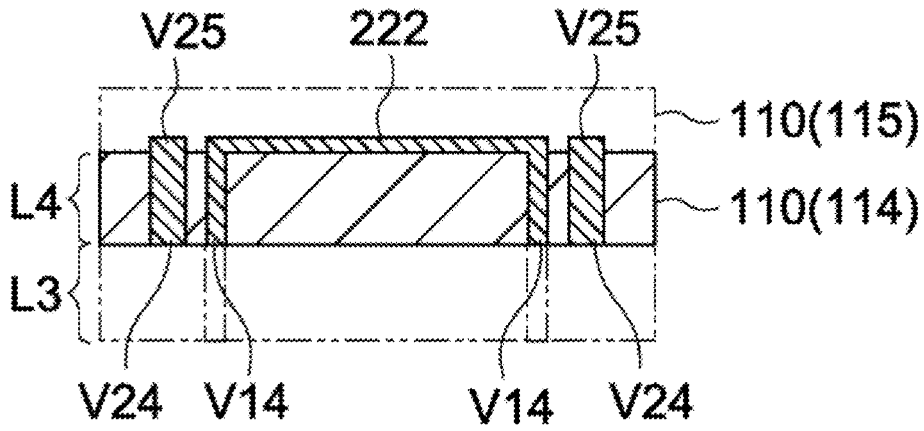

After the resist film R3 and the seed layer SL3 are removed (FIG. 8D), the insulating layer 115 that covers the via conductive members V25 and the connecting conductive members 222 may be formed (FIG. 8D). Although it is not illustrated in the drawings, the surface of the insulating layer 115 may be polished to expose tips of the via conductive members V25, the seed layer and the resist pattern may be subsequently formed, and the electroplating process may be then performed. By repeating the above-described processes, the electrode layer L5 illustrated in FIG. 4 and FIG. 5E is fabricated.

After the conductive layers 301, 302 are formed on the comb-tooth block portion 24 (241, 242) exposed on the surface (the bottom surface 102) of the insulating layer 115, the first and second external electrodes 31, 32 may be formed.

Structure in the Embodiment

In recent years, miniaturization of components advances and so too with conductors and their sectional areas included in the components. Consequently it is very important to prevent deterioration of electric characteristics of the conductors while ensuring insulation between the conductors. Compared to electric components in which insulators are made of ceramics or the like, especially the electric components in which insulators are made of resin are more likely to be affected by environments and especially oxidation of conductors included therein cannot be ignored as the miniaturization of the conductors advances.

Figure 9:
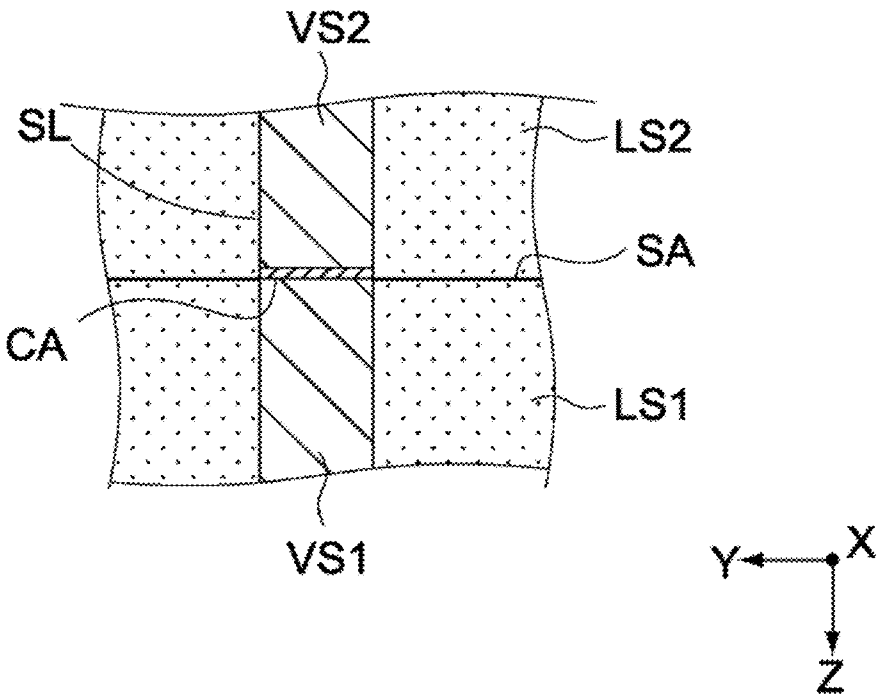
FIG. 9 is a schematic sectional view of a main part of an electronic component of a comparative example illustrating an internal structure of the component.

FIG. 9 schematically illustrates a section of a bonding portion between the two electrode layers stacked on top of each other. The insulating layer LS1 situated as the lower layer may be bonded to the insulating layer LS2 situated as the upper layer via a bonding surface SA. A via conductive member VS1 in the lower layer may be bonded to a corresponding via conductive member VS2 with a contact CA interposed therebetween. The contact CA may correspond to the seed layer SL situated between the two via conductive members VS1, VS2. The both sides of the seed layer SL may form contact surfaces for the via conductive members VS1, VS2.

Here, the via conductive members VS1, VS2 may be formed of metal such as copper and peripheral surfaces of the conductive members VS1, VS2 may directly contact the insulating layers LS1, LS2. The insulating layers LS1, LS2 may be formed of a material that mainly contains resin. There is a possibility that the via conductive members VS1, VS2 are oxidized due to effects of a temperature and humidity of a characteristics evaluation test (a test in the conditions of high ambient temperature and humidity) or an actual-use environment. Consequently the conductive characteristics of the via conductive members VS1, VS2 may be deteriorated.

Figure 10:
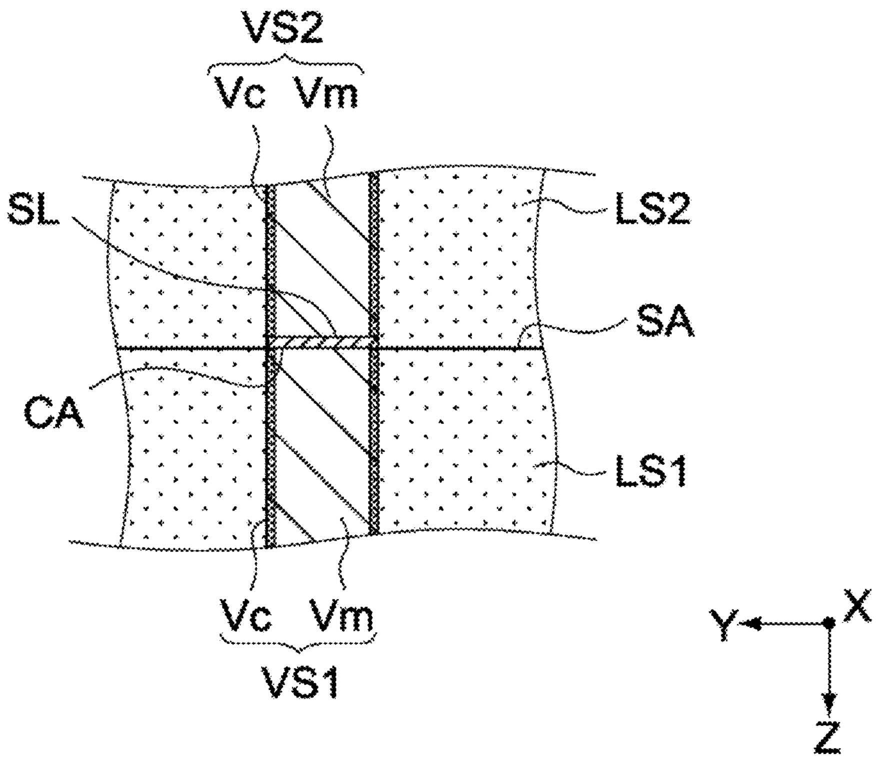
FIG. 10 is a schematic sectional view of a main part of an electronic component of one embodiment of the disclosure illustrating an internal structure of the component.

In order to avoid this from happening, in the electronic component 100 according to the embodiment, the plurality of via conductive members VS1, VS2 that form the pillared conductive members 21 may each include a conductive main body Vm and an outer coating film Vc provided on the peripheral surface of the conductive main body Vm as illustrated in FIG. 10. The outer coating film Vc is configured to serve as a passivation film that prevents the oxidation of the conductive main body Vm.

The structure of the electronic component 100 according to the embodiment will be now described in detail.

As described above, the electronic component 100 according to the embodiment may include the insulator 10 and the internal conductor 20. The insulator 10 may be formed of a material that contains resin. The internal conductor 20 may include the pillared conductive members 21 (211, 212) and may be provided inside the insulator 10. The pillared conductive members 21 may each include the conductive main body Vm and the outer coating film Vc that is provided on the peripheral surface of the conductive main body Vm and that has a resistivity higher than the conductive main body Vm.

In the embodiment, the outer coating film Vc serves as the passivation film that prevents oxidation of the conductive main body Vm, ensures the insulation property between the adjacent pillared conductive members 21, and prevents deterioration of the conductive property of the pillared conductive members 21 due to environmental changes. In short, with the outer coating film Vc, it is possible to prevent further oxidation of the conductive main body Vm caused by environmental changes.

Here, the conductive main body Vm may be formed of metal, for example, made of copper (a Cu plating layer) in this embodiment. Whereas the outer coating film Vc may be made of an oxide of the metal used for the conductive main body Vm. In this embodiment, the outer coating film Vc may be made of copper oxide.

The thickness of the outer coating film Vc is not particularly limited and may be adequately set in accordance with the diameter, the outer diameter, the thickness or the like of the conductive main body Vm. The thickness of the outer coating film Vc may be typically 5 nm to 5 μm (both inclusive). By setting the thickness of the outer coating film Vc in the above-mentioned range, it is possible to stably form the outer coating film Vc with less defects and consequently it is possible to prevent short-circuit between the adjacent pillared conductive members 21.

The outer coating film Vc may be formed of any chemical compound such as nitrides, carbides, sulfides, oxynitrides or the like other than oxides of the conductive main body Vm. Alternatively, the outer coating film Vc may be formed of an oxide of a metallic material other than the metal that forms the conductive main body Vm.

Referring again to FIG. 10, the via conductive member VS1 situated in the lower layer may be electrically coupled to the via conductive member VS2 in the upper layer through the contact CA. As described above, the contact CA may correspond to the seed layer SL situated between the two-adjacent via conductive members VS1, VS2. The both surfaces of the seed layer SL may form contact surfaces for the via conductive members VS1, VS2. The thickness of the contact CA is not particularly limited, for example, 5 nm to 20 nm (both inclusive). In this embodiment, it may be 10 nm. The via conductive members VS1, VS2 may be formed of titanium or chromium, and a film of titanium oxide or chromium oxide may be formed on the peripheral surface of the conductive members VS1, VS2 that contact the insulating layers LS1, LS2.

Moreover, the outer coating film Vc may usually have a higher hardness than the conductive main body Vm. Therefore compared to a case where the outer coating film Vc is not provided, the mechanical strength of the pillared conductive members 21 with the outer coating film Vc is made higher.

Figure 11A:
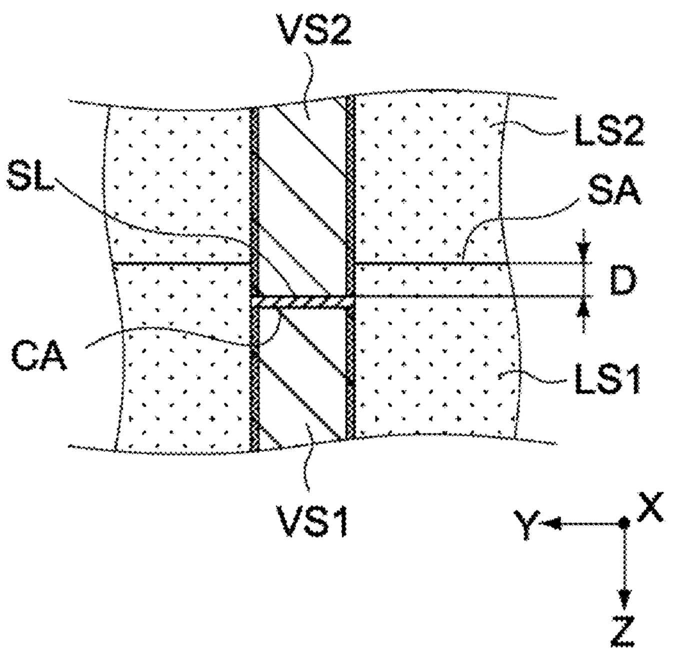
FIGS. 11A and 11B are a schematic sectional views of a main part of an electronic component of one embodiment of the disclosure illustrating an internal structure and operation of the electronic component.
Figure 11B:
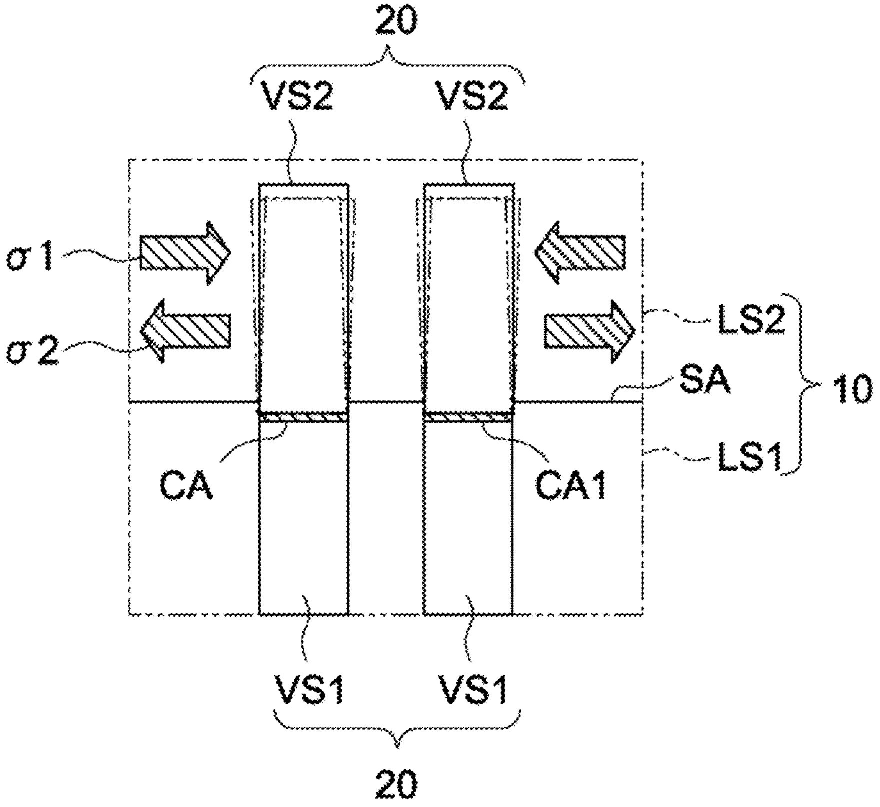

Referring to FIG. 11A, the contact CA between the via conductive member VS1 and the via conductive member VS2 may be disposed at an offset position (a position within the insulating layer LS1 rather than at the bonding surface SA) in the Z-axis direction with reference to the bonding surface SA between the insulating layers LS1, LS2. In this way, it is possible to avoid a contraction stress (σ 1) caused by the hardening process of the insulating layer LS2 and a heat (σ2) caused by a difference of the thermal expansion rate between the insulating layer LS2 and the via conductive member VS2 from concentrating on the contact CA as illustrated in FIG. 11B. Consequently it is possible to further enhance the reliability of the internal conductor 20.

The outer coating film Vc may be provided not only on the peripheral surface of the pillared conductive members 21 (211, 212) but also on a part of the peripheral surfaces of the connecting conductive members 22 (221, 222). Here, "a part of the peripheral surface" may refer to all the surfaces excluding the contact surface (the surface contacting the seed layer) of the connecting conductive member 22. In this way, it is possible to prevent the oxidation of the connecting conductive members 22 due to environmental changes, and effectively prevent deterioration of the electric conductive property over time.

Figure 12A:
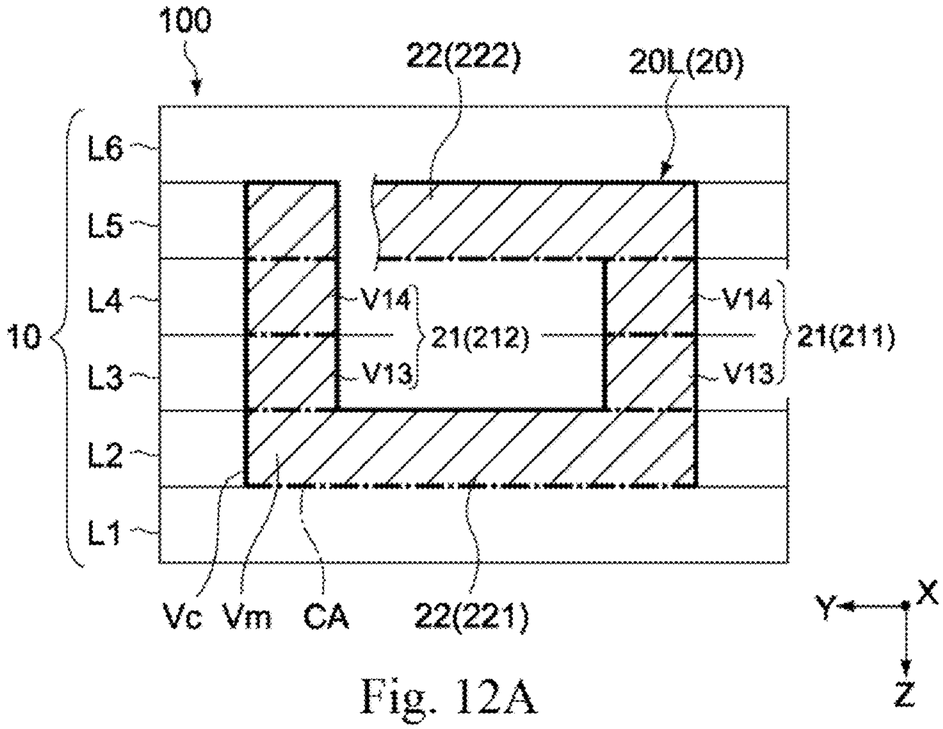
FIG. 12A is a lateral sectional view of an electronic component 100 as viewed from the X-axis direction to schematically illustrate its internal structure.
Figure 12B:
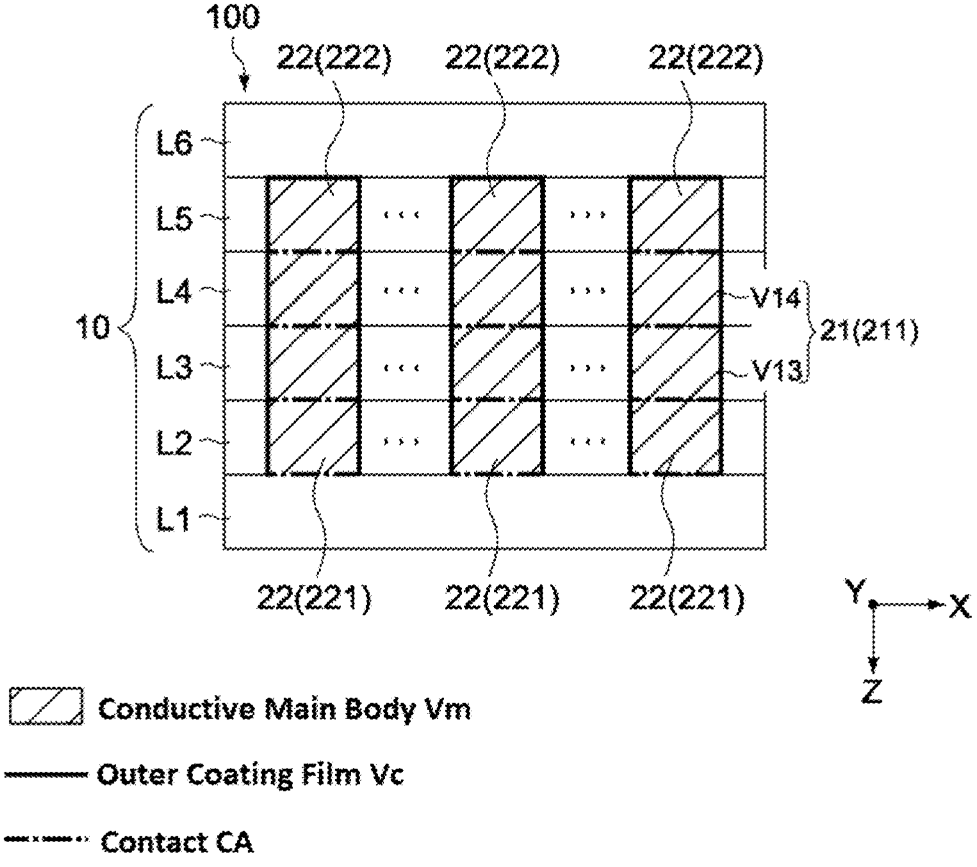
FIG. 12B is a lateral sectional view of the electronic component 100 as viewed from the Y-axis direction to schematically illustrate its internal structure.

FIGS. 12A and 12B are side sectional views schematically showing the internal structure (the coil portion 20L) of the electronic component 100 as viewed from the X-axis direction and the Y-axis direction, respectively. The hatched regions in FIGS. 12A and 12B correspond to the pillared conductive members 21 (211, 212) and the connecting conductive members 22 (221, 222) provided in the electrode layers L2 to L5, respectively.

In FIGS. 12A and 12B, regions (surfaces) indicated by a bold solid line correspond to formation regions of the outer coating film Vc, and regions (surfaces) indicated by a dashed-dotted line correspond to formation regions of the seed layer that serve as the contact surface. By providing the outer coating film Vc on all the surfaces of the pillared conductive members 21 and the connecting conductive members 22 where contact the insulator 10 as described above, it is possible to suppress excessive oxidation of conductors due to oxygen in the insulator 10 and therefore it is possible to secure stable electrical characteristics of the internal conductor 20. Although it is not shown in the drawings, a similar outer coating film Vc may be formed on a surface of a conductor portion (for example, the comb-tooth block portion 24) other than the coil portion 20L.

To fabricate the outer coating film Vc, for example, the electronic component 100 may be placed in a heating furnace to heat the component. A heating temperature is not particularly limited, but may be 100 to 250° C. A heating duration is also not particularly limited, but may be 1 to 12 hours. The heating may be carried out for a shorter period when the heating temperature is high and the heating may be carried out for a longer period when the heating temperature is low. As an atmosphere used for the heating, the air may be used or a high temperature and high humidity environment for a durability test may be used. With the oxygen inside the insulator 10, the outer coating film made of the oxide of the metal of the internal conductor 20 can be formed on the surface of the internal conductor 20 and at the same time deterioration of the resin of the insulator 10 can be suppressed.

The heating temperature may be set higher than a temperature of the actual use environment. For example, the heating temperature may be 10 to 30° C. higher than the actual use environment temperature. When heated at this temperature, it is possible to suppress change of the internal conductor 20 under the actual use environment. Moreover, the outer coating film Vc formed as described above is an oxide of the metallic material of the conductor so that the internal conductor portion will not be exposed, and even if the thickness is reduced, there will be no defect.

Alternatively, the outer coating film Vc may be formed after the via conductive members are formed by electroplating and before the insulating layer is formed. In this case, a thermal oxidation treatment, a coating process with various insulating materials or the like may be performed on the via conductive members.

As described above, in the electronic component 100 according to the embodiment, the outer coating film Vc that has a higher resistance than the conductive main body is provided on the peripheral surfaces or the surfaces of the conductive main body Vm of the pillared conductive members 21 and the connecting conductive members 22, Therefore insulation characteristics between the conductors in the insulator 10 can be ensured and degradation of the conductive characteristics of the internal conductor portion due to environmental changes can be reduced.

The inventors of the present disclosure measured a change in the resistance value of the internal conductor before and after a high temperature test (150° C., 1000 hours) for a sample of the electronic component that has the outer coating film Vc and a sample of the electronic component that does not have the outer coating film Vc. The measurement results found that the change in the resistance value of the electronic component that does not have the outer coating film was 5%, whereas the change in the resistance value of the electronic component that has the outer coating film was 1% or less.

Moreover, according to the embodiment, even if a distance between adjacent conductive members becomes very small due to elongation (burr) or the like of the end portion of the via conductive member, which may occur when the surface of the insulating layer is ground to expose the via conductive members, such portions are oxidized during the fabrication process of the outer coating film Vc. In this way, short-circuit failure between the conductors due to the burr can be prevented.

The existence of an oxide film such as the outer covering film Vc on any surfaces between the conductive members of the internal conductor may reduce migration. Particularly, in the case of the coil component, by using copper for the conductive members, migration can be effectively suppressed. Moreover stable coil characteristics can be secured, and miniaturization of the internal conductor can be achieved. For example, when silver is used as the conductive material since silver is the metal that has a low specific resistivity like copper, 15 μm of the distance between conductors is required in the case of silver but the distance can be reduced to 5 μm for the case of copper.

Second Embodiment

Figure 13:
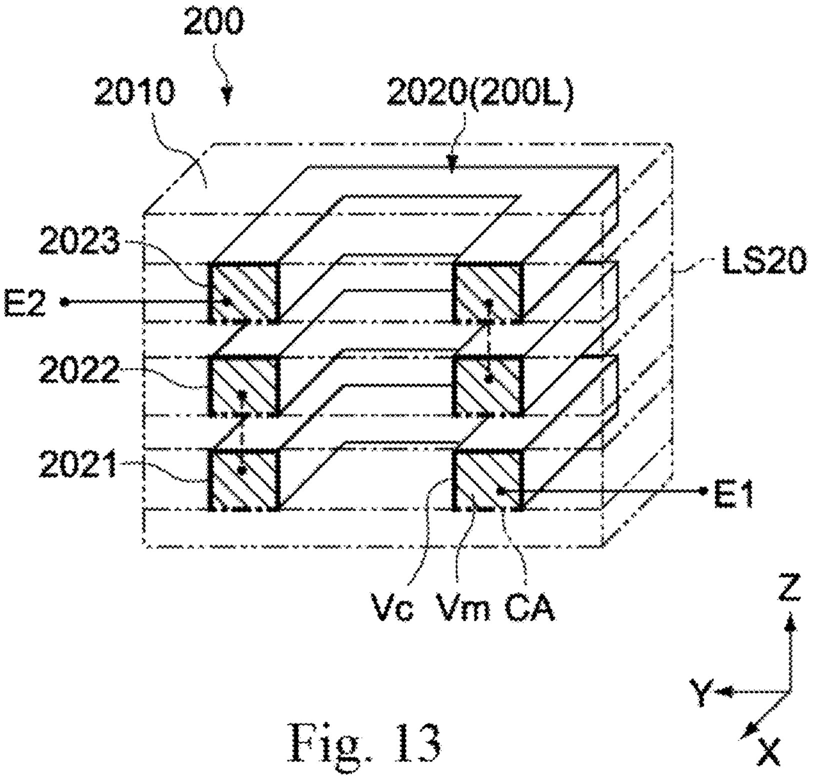
FIG. 13 is a schematic sectional perspective view of an electronic component according to a second embodiment of the disclosure.

FIG. 13 is a schematic sectional perspective view of an electronic component according to a second embodiment of the disclosure.

Structures different from the first embodiment will be hereinafter mainly described. The same reference numerals are given to the same elements as those of the first embodiment, and the description thereof will be omitted or simplified.

The electronic component 200 of this embodiment may include an insulator 2010 and an internal conductor 2020. The internal conductor 2020 is configured as a coil component including a coil portion 200L that are wound around the Z-axis direction. The coil portion 200L in this embodiment may be a stacked-type coil that includes a plurality of windings 2021 to 2023 (three in this example) that are stacked in the Z-axis direction with an insulating layer interposed therebetween.

Similarly to the first embodiment, the insulator 2010 may be formed of a material that mainly contains resin and may include a plurality of insulating layers LS20 stacked in the Z-axis direction. The electronic component 200 may be fabricated by building up the insulating layer LS20 and the windings 2021 to 2023 alternately from the lower layer side (or the upper layer side).

Each of the windings 2021 to 2023 may be made of copper, nickel or silver, and may be formed on the insulating layer LS20 that serves as a base layer by electroplating. The windings 2021 to 2023 that face to each other in the Z-axis direction may be electrically connected through vias (not shown). One end of the coil portion 200L may be electrically coupled to one external electrode E1 and the other end may be electrically coupled to other external electrode E2.

Similarly to the first embodiment, the windings 2021 to 2023 may each include the conductive main body Vm, the outer coating film Vc, and the contact CA. The contact CA may be provided in regions indicated by a dashed-dotted line in the drawing (the lower surfaces of the windings 2021 to 2023) and may be formed of a seed layer for electroplating. The outer coating film Vc may be formed on the peripheral surfaces (upper surface and side surface) of the conductive main body Vm that contacts the insulating layer LS20 other than the contact CA. The outer coating film Vc may be made of an oxide of the metal of the conductive main body Vm.

For the electronic component 200 of this embodiment configured as described above, it is possible to obtain the same advantageous effects as the abovedescribed first embodiment. In particular, according to the embodiment, since the outer coating film Vc with a higher resistance than the conductive main body Vm is interposed between the surfaces of the windings 2021 to 2023 opposed in the stacking direction (the Z-axis direction). Therefore desired insulation characteristics can be ensured even if the thickness of the insulating layer LS20 situated between the windings 2021 to 2023 is reduced. In this way, it is possible to reduce the overall thickness of the electronic component 200.

Third Embodiment

Figure 14:
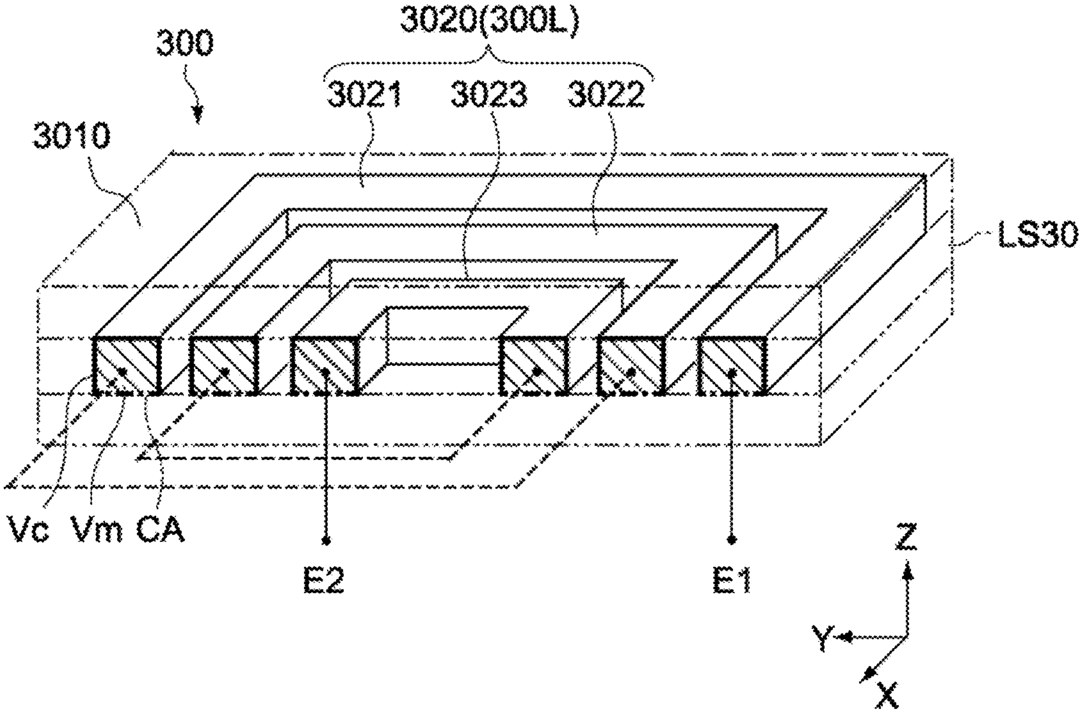
FIG. 14 is a schematic sectional perspective view of an electronic component according to a third embodiment of the disclosure.

FIG. 14 is a schematic sectional perspective view of an electronic component according to a third embodiment of the disclosure. Structures different from the first embodiment will be hereinafter mainly described. The same reference numerals are given to the same elements as those of the first embodiment, and the description thereof will be omitted or simplified.

The electronic component 300 of this embodiment may include an insulator 3010 and an internal conductor 3020. The internal conductor 3020 is configured as a coil component including a coil portion 300L that are wound around the Z-axis direction. The coil portion 300L in this embodiment may be a planar type coil (a helical coil) that includes a plurality of windings 3021 to 3023 (three in this example) that are arranged concentrically in the Z-axis direction.

Similarly to the first embodiment, the insulator 3010 may be formed of a material that mainly contains resin and may include a plurality of insulating layers LS30 stacked in the Z-axis direction. The electronic component 300 may be fabricated by building up the insulating layer LS30 and the windings 3021 to 3023 alternately from the lower layer side (or the upper layer side).

Each of the windings 3021 to 3023 may be made of copper, nickel or silver, and may be formed on the insulating layer LS20 that serves as a base layer by electroplating. The windings 3021 to 3023 may be interconnected to each other so as to be continuous around the Z-axis. One end of the coil portion 300L may be electrically coupled to one external electrode E1 and the other end may be electrically coupled to other external electrode E2.

Similarly to the first embodiment, the windings 3021 to 3023 may each include the conductive main body Vm, the outer coating film Vc, and the contact CA. The contact CA may be provided in regions indicated by a dashed-dotted line in the drawing (the lower surfaces of the windings 3021 to 3023) and may be formed of a seed layer for electroplating. The outer coating film Vc may be formed on the peripheral surfaces (upper surface and side surface) of the conductive main body Vm that contacts the insulating layer LS30 other than the contact CA. The outer coating film Vc may be made of an oxide of a metal used as the conductive main body Vm.

For the electronic component 300 of this embodiment configured as described above, it is possible to obtain the same advantageous effects as the abovedescribed first embodiment. In particular, according to the embodiment, since the outer coating film Vc with a higher resistance than the conductive main body Vm is interposed between the surfaces of the windings 3021 to 2023 that oppose to each other in a direction perpendicular to the stacking direction (the Z-axis direction). Therefore desired insulation characteristics can be ensured even if the width of the insulating layer LS30 situated between the windings 3021 to 3023 is reduced. In this way, it is possible to realize the miniaturization of the electronic component 200 and the multiplexing of the windings (increase of the number of the windings).

Fourth Embodiment

Figure 15:
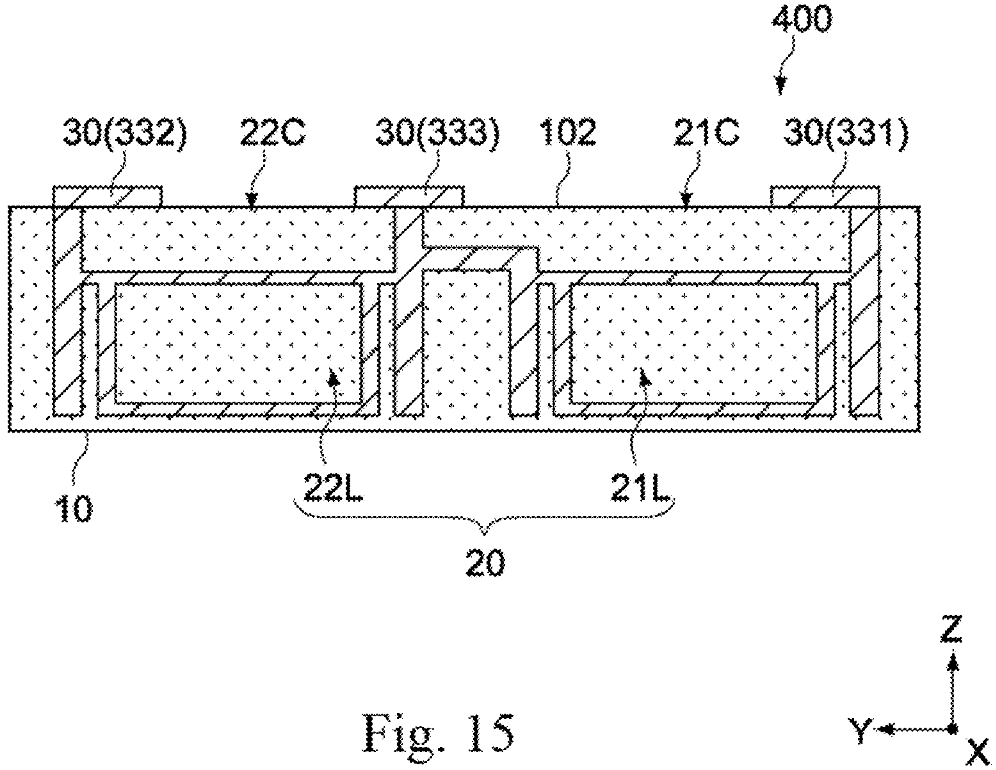
FIG. 15 is a schematic sectional perspective view of an electronic component according to a fourth embodiment of the disclosure.

FIG. 15 is a schematic sectional perspective view of an electronic component according to a fourth embodiment of the disclosure. For ease of understanding, a region corresponding to the internal conductor is indicated by hatching. Structures different from the first embodiment will be hereinafter mainly described. The same reference numerals are given to the same elements as those of the first embodiment, and the description thereof will be omitted or simplified.

An electronic component 400 in this embodiment may include the insulator 10, the internal conductor 20, and the external electrode 30. Like the first embodiment, the electronic component 400 may include the coil component similarly to the first embodiment but the internal conductor 20 may include two coil portions 21L and 22L, which is different from the first embodiment.

In the electronic component 400 of the this embodiment, the two coil portions 21L, 22L may be provided in the insulator 10 and three external electrodes 331, 332, 333 may be provided on the bottom surface 102 of the insulator 10. The coil portion 21L may be coupled between the external electrodes 331 and 333, and the other coil portion 22L may be coupled between the external electrodes 332 and 333.

The number of the coil portions is not particularly limited to two as illustrated but may be three or more. The number of the external electrodes 30 is also not particularly limited to three as illustrated but may be adequately changed. According to the fourth embodiment, more than one coil component may be integrated into a single component.

Fifth Embodiment

Figure 16:
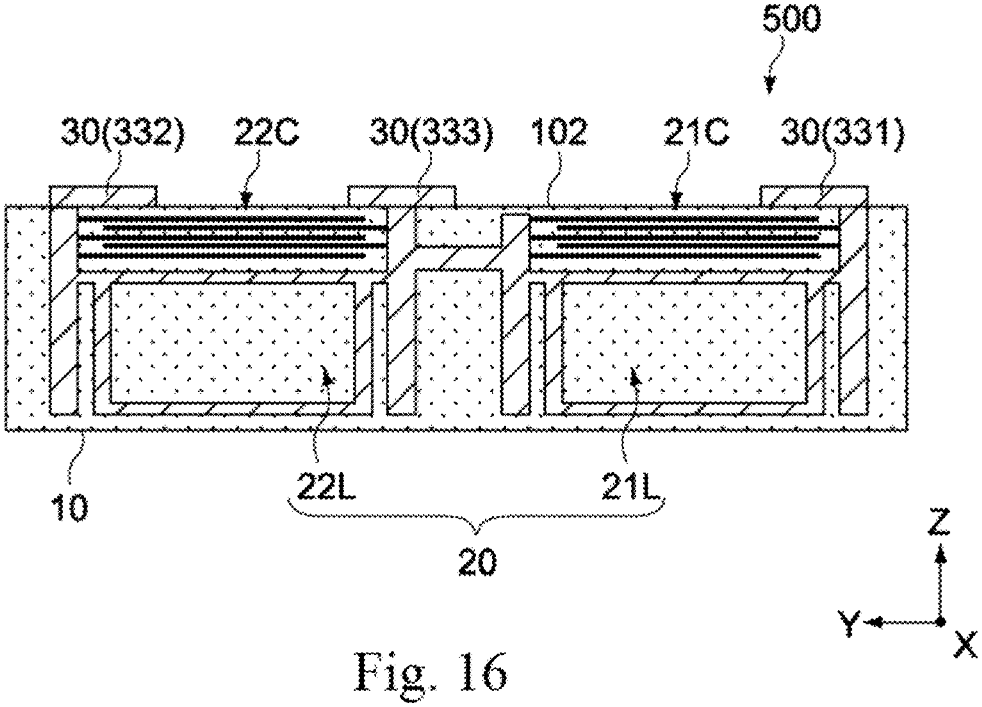
FIG. 16 is a schematic sectional perspective view of an electronic component according to a fifth embodiment of the disclosure.

FIG. 16 is a schematic sectional perspective view of an electronic component according to a fifth embodiment of the disclosure. For ease of understanding, a region corresponding to the internal conductor is indicated by hatching.

Structures different from the fourth embodiment will be hereinafter mainly described. The same reference numerals are given to the same elements as those of the second embodiment, and the description thereof will be omitted or simplified.

An electronic component 500 in this embodiment may include the insulator 10, the internal conductor 20, and the external electrode 30. The internal conductor 20 may include two coil portions 21L and 22L, which is same as the fourth embodiment, but the internal conductor 20 may further include two capacitor elements 21C, 22C, which is different from the fourth embodiment.

The capacitor element 21C may be provided between the coil portion 21L and the bottom surface 102 of the insulator 10, and may be coupled to the external electrodes 331, 333 in parallel with the coil portion 21L. The capacitor element 22C may be provided between the coil portion 22L and the bottom surface 102 of the insulator 10, and may be coupled to the external electrodes 332, 333 in parallel with the coil portion 22L.

Each of the capacitor elements 21C and 22C may include a first internal electrode layer electrically coupled to one ends of the coil portions 21L and 22L and a second internal electrode layer electrically coupled to the other ends of the coil portions 21L and 22L. The second internal electrode layer may face the first internal electrode layer in the Z-axis direction to form capacitors. The capacitor elements 21C, 22 C may be disposed between the coil portions 21L, 22L and the external electrodes 331 to 333, thereby forming the LC integrated electronic component 500.

The invention is not limited to the above described embodiments and various modification can be made.

For example, in the embodiments described above, the insulating layers and the via conductive members are alternately layered from the top surface side to the bottom surface side to fabricate the electronic component. Alternatively the insulating layers and the via conductive members may be alternately layered from the bottom surface side to the top surface side.

Furthermore, in the above embodiments, the coil component and the LC component were described as examples of the electronic component, but it is also possible to use other components such as a capacitor component, a resistive component, a multilayer wiring substrate and the like. The invention is also applicable to other electronic components that include internal conductors and are formed by building up on a layer-by-layer basis in the height direction.

What is claimed is:

1. A method for manufacturing a coil component comprising:
- a step of forming an intermediate body including an insulator containing a resin and a coil conductor provided inside the insulator;
- a step of forming an external electrode provided on the intermediate body and electrically coupled to the coil conductor; and
- a step of thermally oxidizing the coil conductor, after forming the intermediate body including the insulator and the coil conductor provided inside the insulator, to form an outer coating film on at least a part of a peripheral surface of the coil conductor.

2. The method for manufacturing the coil component according to claim 1, wherein the thermal oxidization is performed at between 100° C. to 250° C.

3. The method for manufacturing the coil component according to claim 1, wherein the thermal oxidization is performed in air.

4. The method for manufacturing the coil component according to claim 1, wherein the outer coating film has a resistivity higher than the coil conductor.

5. The method for manufacturing the coil component according to claim 1, wherein the coil conductor contains at least one metal; and
- wherein the outer coating film is made of an oxide of at least one of said at least one metal.

6. The method for manufacturing the coil component according to claim 1, wherein the step of forming the intermediate body comprises a step of forming the coil conductor and a step of forming the insulator.

7. The method for manufacturing the coil component according to claim 6, wherein the step of forming the coil conductor comprises a step of forming a plurality of pillared conductive members that extend in one axial direction and a step of forming a plurality of connecting conductive members each of which couples two of the plurality of pillared conductive members.

8. The method for manufacturing the coil component according to claim 7, wherein the plurality of pillared conductive members and the plurality of connecting conductive members form a coil portion wound around an axis perpendicular to the one axial direction.

9. The method for manufacturing the coil component according to claim 7,
- wherein the step of forming the insulator comprises a step of forming a first insulating layer having a bonding surface perpendicular to the one axial direction and a step of forming a second insulating layer bonded to the bonding surface; and
- wherein the step of forming a plurality of pillared conductive members comprises a step of forming a first via conductive member in the first insulating layer and a step of forming a second via conductive member in the second insulating layer and bonded to the first via conductive member.

10. The method for manufacturing the coil component according to claim 9, wherein the step of forming the coil conductor further comprises a step of forming a contact between the first via conductive member and the second via conductive member.

11. The method for manufacturing the coil an electronic component according to claim 10, wherein the coil conductor is formed of a first conductive material;
- and wherein the contact is formed of a second conductive material different from the first conductive material.

12. The method for manufacturing the coil component according to claim 11, wherein the contact is formed of a metallic material containing titanium or chromium.

13. The method for manufacturing the coil component according to claim 9, wherein the first and second via conductive members are made of a metallic material containing copper, silver or nickel.

14. The method for manufacturing the coil component according to claim 1,
- wherein the coil conductor includes a plurality of windings, and
- wherein the plurality of windings form a coil portion that is wound around one axial direction.

15. The method for manufacturing the coil component according to claim 1, wherein the insulator further containing ceramic particles.

16. The method for manufacturing the coil component according to claim 1, wherein the coil conductor comprise at least one metal; and the outer coating film may be formed of an oxide of a metallic material other than the at least one metal that forms the coil conductor.

17. The method for manufacturing the coil component according to claim 1, wherein the coil conductor comprises a Cu plating layer and the outer coating film is made of copper oxide.

* * * * *